US012231051B2

United States Patent
Sato et al.

(10) Patent No.: US 12,231,051 B2
(45) Date of Patent: Feb. 18, 2025

(54) POWER CONVERSION APPARATUS HAVING MULTIPLE LLC CONVERTERS AND CAPABLE OF ACHIEVING DESIRED OUTPUT VOLTAGE EVEN IN CHANGES IN LOAD CURRENT

(71) Applicant: OMRON Corporation, Kyoto (JP)

(72) Inventors: Mitsuru Sato, Kyoto (JP); Shingo Nagaoka, Kyoto (JP); Takeshi Uematsu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 221 days.

(21) Appl. No.: 18/004,334

(22) PCT Filed: Jul. 5, 2021

(86) PCT No.: PCT/JP2021/025238
§ 371 (c)(1),
(2) Date: Jan. 5, 2023

(87) PCT Pub. No.: WO2022/009818
PCT Pub. Date: Jan. 13, 2022

(65) Prior Publication Data
US 2023/0223856 A1 Jul. 13, 2023

(30) Foreign Application Priority Data

Jul. 8, 2020 (JP) .................................. 2020-117619

(51) Int. Cl.
*H02M 3/335* (2006.01)
*H02M 1/08* (2006.01)
(Continued)

(52) U.S. Cl.
CPC ....... *H02M 3/33573* (2021.05); *H02M 1/081* (2013.01); *H02M 1/4216* (2013.01); *H02M 3/01* (2021.05)

(58) Field of Classification Search
CPC .... H02M 3/33573; H02M 3/01; H02M 1/081; H02M 1/4216
See application file for complete search history.

(56) References Cited

U.S. PATENT DOCUMENTS 6,297,976 B1 * 10/2001 Isono ................ H02M 3/33553
363/71
7,035,125 B2 * 4/2006 Yoshida ................ H02M 3/285
363/71
(Continued)

FOREIGN PATENT DOCUMENTS

JP  2016001980 A  1/2016
JP  2019129585 A  8/2019

OTHER PUBLICATIONS

International Search Report for International Application No. PCT/JP2021/025238; Date of Mailing Sep. 14, 2021.
(Continued)

*Primary Examiner* — Rafael O De León Domenech
(74) *Attorney, Agent, or Firm* — CANTOR COLBURN LLP

(57) ABSTRACT

At a first node, an intermediate voltage potential occurs between a voltage potential of the first input terminal and a voltage potential of the second input terminal A second node is connected to ends of primary windings of transformers of LLC resonant converters. A switch circuit is connected between the first node and the second node. A control circuit is configured to turn on a switch circuit when a load current of a load apparatus connected to a first output terminal and a second output terminal is equal to or smaller than a
(Continued)

predetermined criterion and turn off the switch circuit when the load current of the load apparatus is larger than the predetermined criterion.

8 Claims, 16 Drawing Sheets

(51) Int. Cl.
*H02M 1/42* (2007.01)
*H02M 3/00* (2006.01)

(56) References Cited

U.S. PATENT DOCUMENTS

| | | | |
|---|---|---|---|
| 9,148,064 B2* | 9/2015 | Liu | H02M 3/33561 |
| 9,780,678 B2* | 10/2017 | Adragna | H02M 3/01 |
| 10,756,637 B2* | 8/2020 | Adragna | H02M 3/335 |
| 12,101,032 B2* | 9/2024 | Sigamani | H02M 3/01 |
| 2008/0298093 A1* | 12/2008 | Jin | H02M 3/285 |
| | | | 363/126 |
| 2010/0328968 A1 | 12/2010 | Adragna et al. | |
| 2016/0254756 A1 | 9/2016 | Yang et al. | |
| 2017/0025963 A1 | 1/2017 | Otake et al. | |
| 2017/0085183 A1* | 3/2017 | Notsch | H02M 1/44 |

OTHER PUBLICATIONS

PCT Written Opinion of the International Searching Authority for International Application No. PCT/JP2021/025238; Date of Mailing, Sep. 14, 2021.
H. Figge et al., "Paralleling of LLC Resonant Converters using Frequency Controlled Current Balancing", Power Electronics Specialists Conference, 2008, PESC 2008. IEEE, IEEE, Piscataway, NJ, USA; Jun. 15, 2008; pp. 1080-1085; XP031300116.
Orietti E et al., "Current Sharing in Three-phase LLC Interleaved Resonant Converter", Energy Conversion Congress and Exposition, 2009. ECCE. IEEE, IEEE, Piscataway, NJ, USA, Sep. 20, 2009; pp. 1145-1152, XP031887989.
Seung-Hee Ryu et al., "Analysis and Design of Modified Half-Bridge Series Resonant Inverter with DC-Link Neutral Point Clamped Cell", 2014 IEEE Energy Conversion Congress and Exposition (ECCE), IEEE, Sep. 14, 2014, pp. 4428-4435, XP03268119.
EPO Extended European Search Report for Corresponding EP Application No. 21838628.2, issued Jul. 5, 2024.

* cited by examiner

POWER CONVERSION APPARATUS HAVING MULTIPLE LLC CONVERTERS AND CAPABLE OF ACHIEVING DESIRED OUTPUT VOLTAGE EVEN IN CHANGES IN LOAD CURRENT

CROSS REFERENCE TO RELATED APPLICATIONS

This is the U.S. national stage of application No. PCT/JP2021/025238, filed on Jul. 5, 2021. Priority under 35 U.S.C. § 119(a) and 35 U.S.C. § 365(b) is claimed from Japanese Application No. 2020-117619, filed Jul. 8, 2020, the disclosure of which is also incorporated herein by reference.

TECHNICAL FIELD

The present disclosure relates to a power conversion apparatus provided with a plurality of LLC resonant converters. In addition, the present disclosure relates to a power system including such a power conversion apparatus.

BACKGROUND ART

When the current flowing through a power conversion apparatus, such as a DC/DC conversion apparatus, increases in order to increase the power to be supplied from the power conversion apparatus to a load apparatus, the heat generated by the power conversion apparatus also increases. Therefore, for the purpose of reducing the heat generated in the power conversion apparatus, there is a known power conversion apparatus provided with multiple components, e.g., a plurality of LLC resonant converters operable at different phases.

In the case where the power conversion circuit is provided with the plurality of LLC resonant converters, transformers, inductors, capacitors, or the like of the LLC resonant converters may have different variations from their designed values. These variations result in inequalities in peaks (amplitudes), effective values, waveforms, and the like of the currents at the respective phases. As a solution to this problem, by connecting one ends of the primary windings of the transformers of the LLC resonators to one another, instead of connecting them to a primary inverter circuit, that is, by applying a floating star connection (Y connection in case of three-phase), it is possible to alleviate current unbalance due to the variations among the circuit components.

For example, Patent Document 1 discloses a power conversion circuit provided with three-phase parallel LLC converters.

CITATION LIST

Patent Documents

PATENT DOCUMENT 1: US Patent Application Publication No. US 2016/0254756 A

SUMMARY OF INVENTION

Technical Problem

The output voltage of the LLC resonant converter varies depending on the switching frequency of the inverter circuit and depending on a load current of a load apparatus connected to the output terminals. In general, near the resonant frequency of the LLC resonant converter, the output voltage decreases when the switching frequency or the load current increases, and the output voltage increases when the switching frequency or the load current decreases.

In the case where a power conversion circuit is provided with a plurality of LLC converters, and the primary windings of the transformers of the LLC resonators are connected as a floating star connection, the output voltage of the power conversion apparatus more significantly varies depending on the load current, as compared with the case of being not connected as a star connection. In particular, when a small load current flows, a desired output voltage may not be achieved within a range of switching frequencies in which the inverter circuit can operate. Therefore, there is a demand for a power conversion apparatus provided with a plurality of LLC resonant converters, and capable of achieving a desired output voltage even when a load current varies.

An object of the present disclosure is to provide a power conversion apparatus provided with a plurality of LLC resonant converters, and capable of achieving a desired output voltage even when a load current varies. In addition, another object of the present disclosure is to provide a power system including such a power conversion apparatus.

Solution to Problem

According to a power conversion apparatus of an aspect of the present disclosure, the power conversion apparatus is provided with three or more LLC resonant converters. Each one of the LLC resonant converters is provided with: a transformer having a primary winding and a secondary winding; an inverter circuit connected to the primary winding, a first capacitor connected to the primary winding, and a rectifier circuit connected to the secondary winding, the primary winding having a first end connected to the inverter circuit, and a second end not connected to the inverter circuit but connected to primary windings of other ones of the LLC resonant converters. The power conversion apparatus further is provided with: a first input terminal and a second input terminal connected to the inverter circuits of the LLC resonant converters, a first node at which an intermediate voltage potential between a voltage potential of the first input terminal and a voltage potential of the second input terminal occurs, a second node connected to the second ends of the primary windings of the LLC resonant converters, a switch circuit connected between the first node and the second node, a driving circuit configured to operate the inverter circuits of the LLC resonant converters at a switching frequency and at different phases from one another, a control circuit configured to control the switch circuit and the driving circuit, and a first output terminal and a second output terminal connected to the rectifier circuits of the LLC resonant converters. The control circuit is configured to turn on the switch circuit when a load current of a load apparatus connected to the first output terminal and the second output terminal is equal to or smaller than a predetermined criterion and turn off the switch circuit when the load current of the load apparatus is larger than the predetermined criterion.

With such a configuration, it is possible to achieve a desired output voltage even when a load current varies.

According to a power conversion apparatus of an aspect of the present disclosure, the power conversion apparatus is further provided with a current sensor configured to measure an output current at the first output terminal or the second output terminal. The control circuit is configured to determine that the load current of the load apparatus is equal to or smaller than the predetermined criterion when the output current is equal to or smaller than a first threshold, thereby turning on the switch circuit, and the control circuit is configured to determine that the load current of the load apparatus is larger than the predetermined criterion when the output current is larger than the first threshold, thereby turning off the switch circuit.

With such a configuration, the control circuit can determine, based on the output current, whether or not the load current of the load apparatus is equal to or smaller than the predetermined criterion.

According to a power conversion apparatus of an aspect of the present disclosure, the control circuit is configured to determine that the load current of the load apparatus is equal to or smaller than the predetermined criterion when the switching frequency is equal to or higher than a second threshold, thereby turning on the switch circuit, and the control circuit is configured to determine that the load current of the load apparatus is larger than the predetermined criterion when the switching frequency is equal to lower than a third threshold that is lower than the second threshold, thereby turning off the switch circuit.

With such a configuration, the control circuit can determine, based on the switching frequency, whether or not the load current of the load apparatus is equal to or smaller than the predetermined criterion.

According to a power conversion apparatus of an aspect of the present disclosure, the power conversion apparatus is further provided with a voltage sensor configured to measure an output voltage across the first output terminal and the second output terminal. The control circuit is configured to control the driving circuit to change the switching frequency so as to bring the output voltage closer to a predetermined target voltage.

With such a configuration, it is possible to achieve a desired output voltage.

According to a power conversion apparatus of an aspect of the present disclosure, the switch circuit is configured to pass currents in both directions when the switch circuit is turned on, and to block currents in both directions when the switch circuit is turned off.

With such a configuration, unbalance in the currents and offsets in the voltages are less likely to occur. In addition, there are no significant effects on the waveforms of the voltage and the current when the switch circuit SW transitions from on to off, or vice versa.

According to a power conversion apparatus of an aspect of the present disclosure, the power conversion apparatus is further provided with a pair of second capacitors connected in series across the first input terminal and the second input terminal, the pair of second capacitors having capacitances equal to each other. The first node is provided between the pair of second capacitors.

With such a configuration, it is possible to generate an intermediate voltage potential between a voltage potential of the first input terminal and a voltage potential of the second input terminal, According to a power system of an aspect of the present disclosure, the power system is provided with: a power supply apparatus configured to supply a first DC voltage, the aforementioned power conversion apparatus, configured to convert the first DC voltage into a second DC voltage, and a load apparatus configured to operate with the second DC voltage.

With such a configuration, it is possible to achieve a desired output voltage even when a load current varies.

According to a power system of an aspect of the present disclosure, the power supply apparatus is provided with: a noise filtering apparatus configured to reduce at least one of a normal mode noise signal and a common mode noise signal, a rectifier configured to convert an AC voltage into the first DC voltage, and a power factor controller configured to bring a power factor of the first DC voltage closer to 1.

With such a configuration, the power system can operate with low noise and high power factor.

Advantageous Effects of Invention

The power conversion apparatus according to one aspect of the present disclosure can achieve a desired output voltage even when a load current varies.

BRIEF DESCRIPTION OF DRAWINGS

FIG. 13 is a graph illustrating exemplary waveforms of voltages and currents at the resonant capacitors Cr1 to Cr3, occurring when the switch circuit SW of FIG. 2 transitions from off to on.

FIG. 14 is a graph illustrating exemplary waveforms of voltages and currents at the resonant capacitors Cr1 to Cr3 for a power conversion apparatus according to a third comparison example, with one switch element, instead of the switch circuit SW of FIG. 2, occurring when the switch element transitions from off to on.

DESCRIPTION OF EMBODIMENTS

Figure 1:
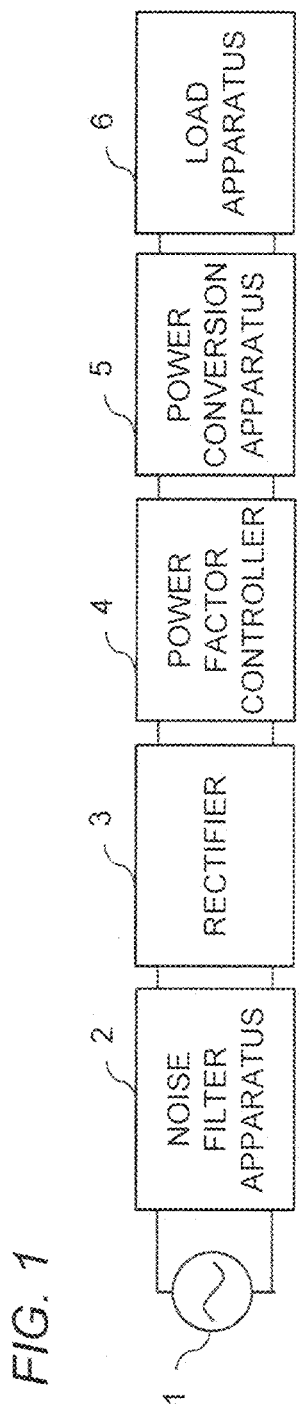
FIG. 1 is a block diagram schematically illustrating a configuration example of a power system including a power conversion apparatus 5 according to a first embodiment.

Now, embodiments according to one aspect of the present disclosure will be described with reference to the drawings. In the drawings, the same reference signs denote the same components.

Application Example

FIG. 1 is a block diagram schematically illustrating a configuration example of a power system including a power conversion apparatus 5 according to a first embodiment. The power system of FIG. 1 is provided with, for example, an AC power supply apparatus 1, a noise filtering apparatus 2, a rectifier 3, a power factor controller 4, a power conversion apparatus 5, and a load apparatus 6.

The noise filtering apparatus 2, the rectifier 3, and the power factor controller 4 are supplied with the AC power from the AC power supply apparatus 1, and generate DC power at a first DC voltage. The noise filtering apparatus 2, the rectifier 3, and the power factor controller 4 (or these components and the AC power supply apparatus 1) collectively constitute one example of a "power supply apparatus" that supplies the first DC voltage. The power conversion apparatus 5 is a DC/DC converter that converts the first DC voltage into a second DC voltage. The load apparatus 6 operates with the second DC voltage.

Figure 2:
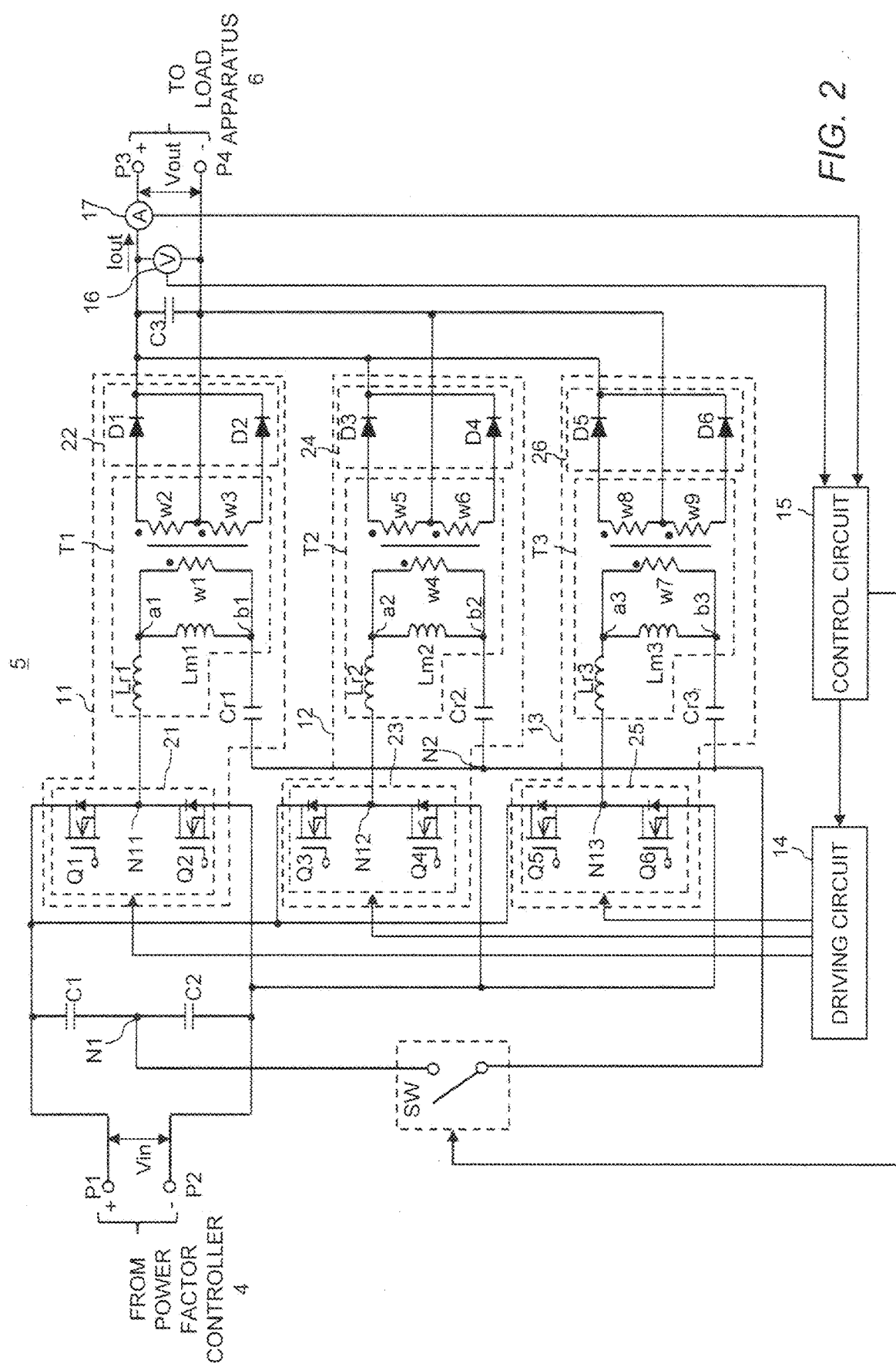
FIG. 2 is a circuit diagram schematically illustrating a configuration example of the power conversion apparatus 5 of FIG. 1.

FIG. 2 is a circuit diagram schematically illustrating a configuration example of the power conversion apparatus 5 of FIG. 1. The power conversion apparatus 5 is provided with at least input terminals P1 and P2, output terminals P3 and P4, LLC resonant converters 11 to 13, capacitors C1 and C2, nodes N1 and N2, a switch circuit SW, a driving circuit 14, and a control circuit 15.

The input terminals P1 and P2 are connected to the power factor controller 4, and are further connected to each of inverter circuits 21, 23, and 25 (described below) of the LLC resonant converter 11 to 13. The LLC resonant converters 11 to 13 are supplied with a DC input voltage Vin from the power factor controller 4 via the input terminals P1 and P2.

The capacitors C1 and C2 have the same capacitance with each other and are connected in series across the input terminals P1 and P2. Therefore, an intermediate voltage potential between a positive voltage potential at the input terminal P1 and a negative voltage potential at the input terminal P2 occurs at the node N1 between the capacitors C1 and C2.

The LLC resonant converter 11 is provided with a transformer T1, an inverter circuit 21, a resonant capacitor Cr1, and a rectifier circuit 22. The transformer T1 has a primary winding w1 and secondary windings w2, w3, and also has a magnetizing inductance Lm1 and a leakage inductance Lr1. The inverter circuit 21 and the resonant capacitor Cr1 are connected to the primary winding w1. The resonant capacitor Cr1, the magnetizing inductance Lm1, and the leakage inductance Lr1 constitute an LLC resonance circuit. In addition, the rectifier circuit 22 is connected to the secondary windings w2 and w3.

The LLC resonant converter 12 is provided with a transformer T2, an inverter circuit 23, a resonant capacitor Cr2, and a rectifier circuit 24. The transformer T2 has a primary winding w4 and secondary windings w5, w6, and also has a magnetizing inductance Lm2 and a leakage inductance Lr2. The inverter circuit 23 and the resonant capacitor Cr2 are connected to the primary winding w4. The resonant capacitor Cr2, the magnetizing inductance Lm2, and the leakage inductance Lr2 constitute an LLC resonance circuit. In addition, the rectifier circuit 24 is connected to the secondary windings w5 and w6.

The LLC resonant converter 13 is provided with a transformer T3, an inverter circuit 25, a resonant capacitor Cr3, and a rectifier circuit 26. The transformer T3 has a primary winding w7 and secondary windings w8, w9, and also has a magnetizing inductance Lm3 and a leakage inductance Lr3. The inverter circuit 25 and the resonant capacitor Cr3 are connected to the primary winding w7. The resonant capacitor Cr3, the magnetizing inductance Lm3, and the leakage inductance Lr3 constitute an LLC resonance circuit. In addition, the rectifier circuit 26 is connected to the secondary windings w8 and w9.

The primary winding w1 of the transformer T1 has terminals a1 and b1. The terminal a1 is connected to the inverter circuit 21. The terminal b1 is not connected to the inverter circuits 21, 23, 25, but connected to the primary windings w4, w7 of the other LLC resonant converters 12, 13, via the resonant capacitors Cr1 to Cr3. Similarly, the primary winding w4 of the transformer T2 has terminals a2 and b2. The terminal a2 is connected to the inverter circuit 23. The terminal b2 is not connected to the inverter circuits 21, 23, 25, but connected to the primary windings w1, w7 of the other LLC resonant converters 11, 13, via the resonant capacitors Cr1 to Cr3. Similarly, the primary winding w7 of the transformer T3 has terminals a3 and b3. The terminal a3 is connected to the inverter circuit 25. The terminal b3 is not connected to the inverter circuits 21, 23, 25, but connected to the primary windings w1, w4 of the other LLC resonant converters 11, 12, via the resonant capacitors Cr1 to Cr3.

The terminals b1 to b3 of the primary windings w1, w4, w7 of of the LLC resonant converter 11 to 13 are connected to the node N2 via the resonant capacitors Cr1 to Cr3, respectively.

The output terminals P3 and P4 are connected to the rectifier circuits 22, 24, and 26 of the LLC resonant converter 11 to 13, and are further connected to the load apparatus 6. The DC output voltage Vout and the DC output current Iout converted by the power conversion apparatus 5 are supplied to the load apparatus 6 via the output terminals P3, P4.

The switch circuit SW is connected between the nodes N1 and N2 and is turned on/off under the control of the control circuit 15. For example, the switch circuit SW is configured to pass currents in both directions when turned on, and to block currents in both directions when turned off.

Under the control of the control circuit 15, the driving circuit 14 operates the inverter circuits 21, 23, 25 of the LLC resonant converters 11 to 13 at a switching frequency fsw and at different phases from one another (e.g., with a phase difference of 120 degrees).

The control circuit 15 turns on the switch circuit SW when a load current of the load apparatus 6 connected to the output terminals P3 and P4 is equal to or smaller than a predetermined criterion, and turns off the switch circuit SW when the load current of the load apparatus 6 is larger than the predetermined criterion. In addition, the control circuit 15 sets the switching frequency fsw for the inverter circuits 21, 23, 25, to the driving circuit 14. The control circuit 15 controls the driving circuit 14 to change the switching frequency fsw so as to bring the output voltage Vout closer to a predetermined target voltage.

When the switch circuit SW is turned off, in other words, when the primary windings w1, w4, w7 of the transformers T1 to T3 are connected as a floating Y connection, the output voltage Vout largely depends on the load current of the load apparatus 6, as will be described below. In particular, when a small load current flows through the load apparatus 6, a difference between the output voltage Vout and the target voltage may become large. Therefore, when a small load current flows through the load apparatus 6, the power conversion apparatus 5 can to operate the inverter circuits 21, 23, 25 within a range of operable switching frequencies fsw by turning on the switch circuit SW, thus achieving a desired output voltage. On the other hand, when a moderate or more load current flows through the load apparatus 6, the switch circuit SW is turned off, so that the primary windings w1, w4, w7 of the transformers T1 to T3 are connected as a floating Y connection. As a result, when the switch circuit SW is turned off, it is possible to alleviate unbalance in currents due to variations among circuit components of the power conversion apparatus 5, as compared with that when the switch circuit SW is turned on. In addition, when a moderate or more load current flows through the load apparatus 6, it is possible to operate the inverter circuits 21, 23, 25 within the range of operable switching frequencies fsw, thus achieving a desired output voltage, regardless of whether the switch circuit SW is turned on or off. As a result, the power conversion apparatus 5 can achieve the desired output voltage even when the load current varies.

First Embodiment

Hereinafter, the power system provided with the power conversion apparatus according to the first embodiment will be further described.

Configuration Example of First Embodiment

The components of the power system will be further described with reference to FIG. 1.

The AC power supply apparatus 1 supplies AC power at a certain voltage and a certain frequency. The AC power supply apparatus 1 may be a power supply facility of a commercial power supply network, or alternatively, may be provided with, for example, a DC power supply apparatus and an inverter.

The noise filtering apparatus 2 is configured to reduce at least one of a normal mode noise signal and a common mode noise signal traveling through conductive wires. The noise filtering apparatus 2 is provided with at least one of an active filter including active elements for generating an inverted signal having a polarity opposite to the polarity of the noise signal, and a passive filter made of passive elements, such as capacitors and inductors.

The rectifier 3 is supplied with the AC power from the AC power supply apparatus 1 via the noise filtering apparatus 2, and converts the AC power into DC power. The rectifier 3 may be a rectifier circuit provided with a diode bridge. Further, the rectifier 3 may be a synchronous rectifier circuit provided with switching elements operating in accordance with the phase of an inputted AC voltage or AC current.

The power factor controller 4 improves the power factor of the DC power outputted from the rectifier 3 (in other words, brings the power factor closer to "1"). The power factor controller 4 may be provided with passive elements, such as inductors and/or capacitors, and may be further provided with active elements, such as transistors and diodes.

The power conversion apparatus 5 converts the first DC voltage outputted from the power factor controller 4, into the second DC voltage.

The load apparatus 6 operates with the DC power outputted from the power conversion apparatus 5 to do some work. The load apparatus 6 includes, for example, a motor, a rechargeable battery, a sensor, and a communication apparatus.

Now, the components of the power conversion apparatus 5 will be further described with reference to FIG. 2.

In the example of FIG. 2, each of the inverter circuits 21, 23, and 25 constitutes a half-bridge inverter provided with a pair of switching elements Q1 and Q2, a pair of switching elements Q3 and Q4, or a pair of switching elements Q5 and Q6, respectively. A node N11 between the switching elements Q1 and Q2 is connected to the terminal a1 of the primary winding w1. A node N12 between the switching elements Q3 and Q4 is connected to the terminal a2 of the primary winding w4. A node N13 between the switching elements Q5 and Q6 is connected to the terminal a3 of the primary winding w7. In the example of FIG. 2, the leakage inductance Lr1 is illustrated between the node N11 and the terminal a1, the leakage inductance Lr2 is illustrated between the node N12 and the terminal a2, and the leakage inductance Lr3 is illustrated between the node N13 and the terminal a3.

In the example of FIG. 2, the rectifier circuit 22 is provided with diodes D1 and D2. Both ends of the secondary windings w2 and w3 of the transformer T1 are connected to the positive output terminal P3 of the power conversion apparatus 5 via the diodes D1 and D2, respectively, and a center tap of the secondary windings w2 and w3 is connected to the negative output terminal P4 of the power conversion apparatus 5. In addition, the rectifier circuit 24 is provided with diodes D3 and D4. Both ends of the secondary windings w5 and w6 of the transformer T2 are connected to the positive output terminal P3 of the power conversion apparatus 5 via the diodes D3 and D4, respectively, and a center tap of the secondary windings w5 and w6 are connected to the negative output terminal P4 of the power conversion apparatus 5. In addition, the rectifier circuit 26 is provided with diodes D5 and D6. Both ends of the secondary windings w8 and w9 of the transformer T3 are connected to the positive output terminal P3 of the power conversion apparatus 5 via diodes D5 and D6, respectively, and a center tap of the secondary windings w8 and w9 is connected to the negative output terminal P4 of the power conversion apparatus 5. Each of the rectifier circuits 22, 24, 26 using the center taps of the secondary windings constitutes one example of the rectifier circuit according to the embodiment.

The power conversion apparatus 5 may by further provided with a capacitor C3 connected between the output terminals P3 and P4, in order to smooth the output power from the LLC resonant converters 11 to 13.

In addition, the LLC resonant converters 11 to 13 operate at different phases from one another, as described above. Therefore, the driving circuit 14 transmits control signals to the switching elements Q1 and Q2 to turn on the switching element Q1 and turn off the switching element Q2 in the first half of each cycle and turn off the switching element Q1 and turn on the switching element Q2 in the second half of each cycle. In addition, the driving circuit 14 transmits control signals to the switching elements Q3 and Q4 to turn on the switching element Q3 and turn off the switching element Q4 in the first half of each cycle delayed by 120 degrees with respect to the beginning of the cycle in which the switching elements Q1 and Q2 operate, and turn off the switching element Q3 and turn on the switching element Q4 in the second half of that cycle. In addition, the driving circuit 14 transmits control signals to the switching elements Q5 and Q6 to turn on the switching element Q5 and turn off the switching element Q6 in the first half of each cycle delayed by 240 degrees with respect to the beginning of the cycle in which the switching elements Q1 and Q2 operate, and turn off the switching element Q5 and turn on the switching element Q6 in the second half of that cycle. As a result, the LLC resonant converter 11 to 13 generates three-phase power with a phase difference of 120 degrees.

As described above, the output voltage Vout of the LLC resonant converters 11 to 13 depends on the switching frequency fsw of the switching elements Q1 to Q6. Therefore, the driving circuit 14 changes the switching frequency fsw of the switching elements Q1 to Q6, based on a desired output voltage Vout from the power conversion apparatus 5.

In the example of FIG. 2, the power conversion apparatus 5 is further provided with a current sensor 17 that measures the output current Iout at the output terminal P3 or P4. When the output voltage Vout is generated according to the predetermined target voltage, the output current Iout increases as the load current of the load apparatus 6 increases, and the output current Iout decreases as the load current decreases. As a result, the control circuit 15 can determine, based on the output current Iout, whether or not the load current of the load apparatus 6 is equal to or smaller than a predetermined criterion. The control circuit 15 turns on the switch circuit SW when the output current Iout is equal to or smaller than a threshold Ith and turns off the switch circuit SW when the output current Iout is larger than the threshold Ith.

In the example of FIG. 2, the power conversion apparatus 5 is further provided with a voltage sensor 16 that measures the output voltage Vout across the output terminals P3 and P4. The control circuit 15 controls the driving circuit 14 to change the switching frequency fsw so as to bring the output voltage Vout closer to the predetermined target voltage.

The control circuit 15 may be a dedicated circuit that executes a power conversion process, which will be described below with reference to FIG. 9 or 18, or may be a general-purpose processor that executes a certain program.

The driving circuit 14 and the control circuit 15 may be configured as separate circuits or may be configured as an integrated circuit.

Figure 3:
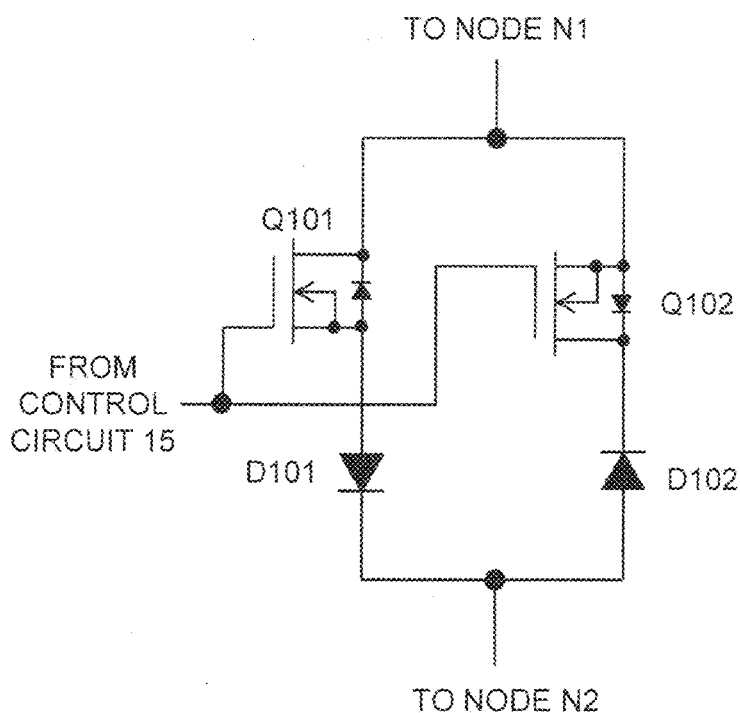
FIG. 3 is a circuit diagram schematically illustrating a configuration example of a switch circuit SW of FIG. 2.

FIG. 3 is a circuit diagram schematically illustrating a configuration example of the switch circuit SW of FIG. 2. The switch circuit SW of FIG. 3 is provided with switching elements Q101 and Q102, and diodes D101 and D102. The switching elements Q101 and Q102 are, for example, MOSFETs including body diodes. The switching element Q101 and the diode D101 are connected in series with each other, and in such a manner that the anode (or cathode) of the body diode of the switching element Q101 and the anode (or cathode) of the diode D101 are opposed to each other. Similarly, the switching element Q102 and the diode D102 are connected in series with each other, and in such a manner that the cathode (or anode) of the body diode of the switching element Q102 and the cathode (or anode) of the diode D102 are opposed to each other. The series circuit of the switching element Q102 and the diode D102 is connected in parallel to the series circuit of the switching element Q101 and the diode D101. The switching elements Q101 and Q102 are simultaneously turned on or off in accordance with a control signal from the control circuit 15. As a result, the switch circuit SW is configured to pass currents in both directions when turned on, and to block currents in both directions when turned off.

Figure 4:
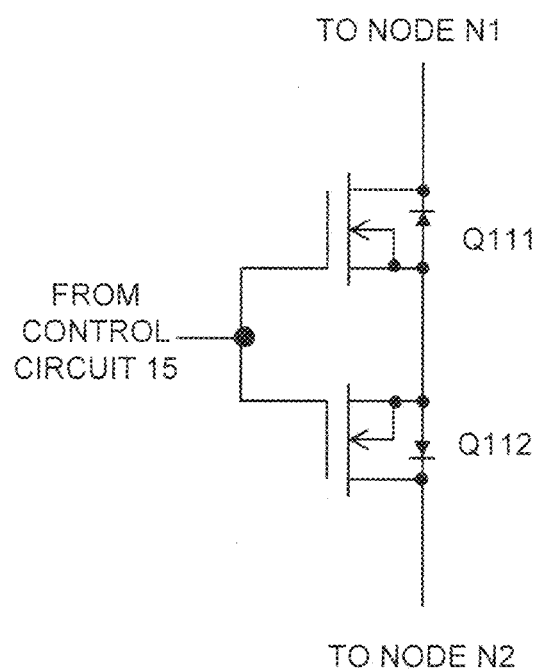
FIG. 4 is a circuit diagram schematically illustrating a modified embodiment of the switch circuit SW of FIG. 2.

FIG. 4 is a circuit diagram schematically illustrating a modified embodiment of the switch circuit SW of FIG. 2. The power conversion apparatus 5 of FIG. 2 may be provided with a switch circuit SWA of FIG. 4, instead of the switch circuit SW of FIG. 3. The switch circuit SWA of FIG. 4 is provided with switching elements Q111 and Q112. The switching elements Q111 and Q112 are, for example, MOSFETs including body diodes. The switching elements Q111 and Q112 are connected in series with each other, and in such a manner that anodes (or cathodes) of the body diodes are opposed to each other. The switching elements Q111 and Q112 are simultaneously turned on or off in accordance with a control signal from the control circuit 15. As a result, the switch circuit SWA is configured to pass currents in both directions when turned on, and to block currents in both directions when turned off.

Operation Example of First Embodiment

Now, an operation example of the power conversion apparatus 5 according to the first embodiment will be described with reference to FIGS. 5 to 14.

Figure 5:
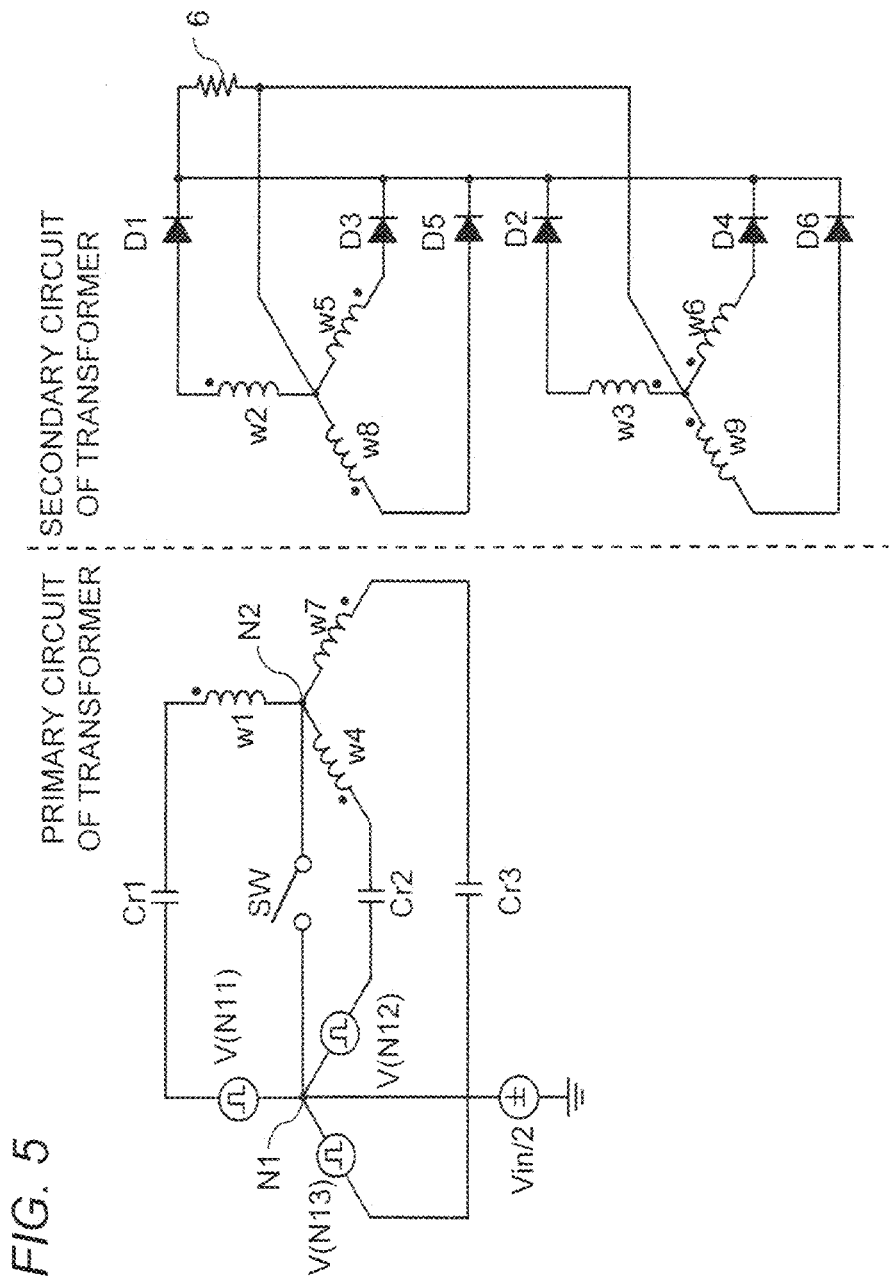
FIG. 5 is an equivalent circuit diagram of the power conversion apparatus 5 of FIG. 2.

FIG. 5 is an equivalent circuit diagram of the power conversion apparatus 5 of FIG. 2. In FIG. 5, the magnetizing inductances Lm1 to Lm3 and the leakage inductances Lr1 to Lr3 are omitted for ease of illustration. As described above, the intermediate voltage potential between the positive voltage potential at the input terminal P1 and the negative voltage potential at the input terminal P2, that is, the voltage potential Vin/2 half the input voltage occurs at the node N1. With respect to the voltage potential of the node N1, AC voltages V(N11) to V(N13) with a phase difference of 120 degrees occur at the nodes N1 to N13, respectively. When the switch circuit SW is turned off, the primary windings w1, w4, and w7 of the transformers T1 to T3 are connected as a floating Y connection. On the other hand, when the switch circuit SW is turned on, the primary windings w1, w4, and w7 of the transformers T1 to T3 are not connected as a floating Y connection, but are connected to the node N1, that is, the voltage source of the voltage potential Vin/2.

Figure 6:
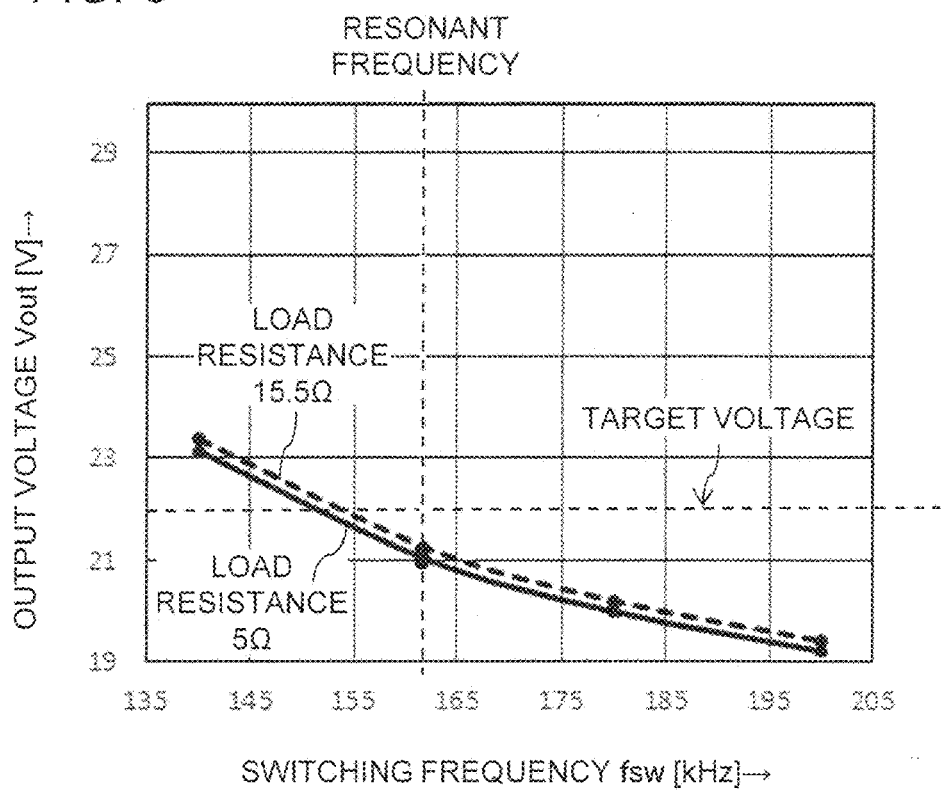
FIG. 6 is a graph illustrating characteristics of output voltage Vout versus switching frequency fsw for a power conversion apparatus according to a first comparison example, without a floating Y connection.

FIG. 6 is a graph illustrating characteristics of output voltage Vout versus switching frequency fsw for a power conversion apparatus according to a first comparison example, without a floating Y connection. FIG. 6 illustrates the characteristics of output voltage Vout versus switching frequency fsw for the power conversion apparatus configured by removing the capacitors C1 and C2 and the switch circuit SW from the power conversion apparatus 5 of FIG.

2 and connecting the node N2 to the input terminal P2, with changing a load resistance of the load apparatus 6. When the output voltage Vout is generated according to a predetermined target voltage, in general, the load current decreases as the load resistance increases, and the load current increases as the load resistance decreases. According to FIG. 6, it can be seen that when the power conversion apparatus operates at a switching frequency fsw, only a small change occurs in the output voltage Vout even when the load resistance varies. Therefore, even if the load current varies, it is possible to bring the output voltage Vout closer to the target voltage, with a small change in the switching frequency fsw, near the resonant frequency of the LLC resonant converter.

Figure 7:
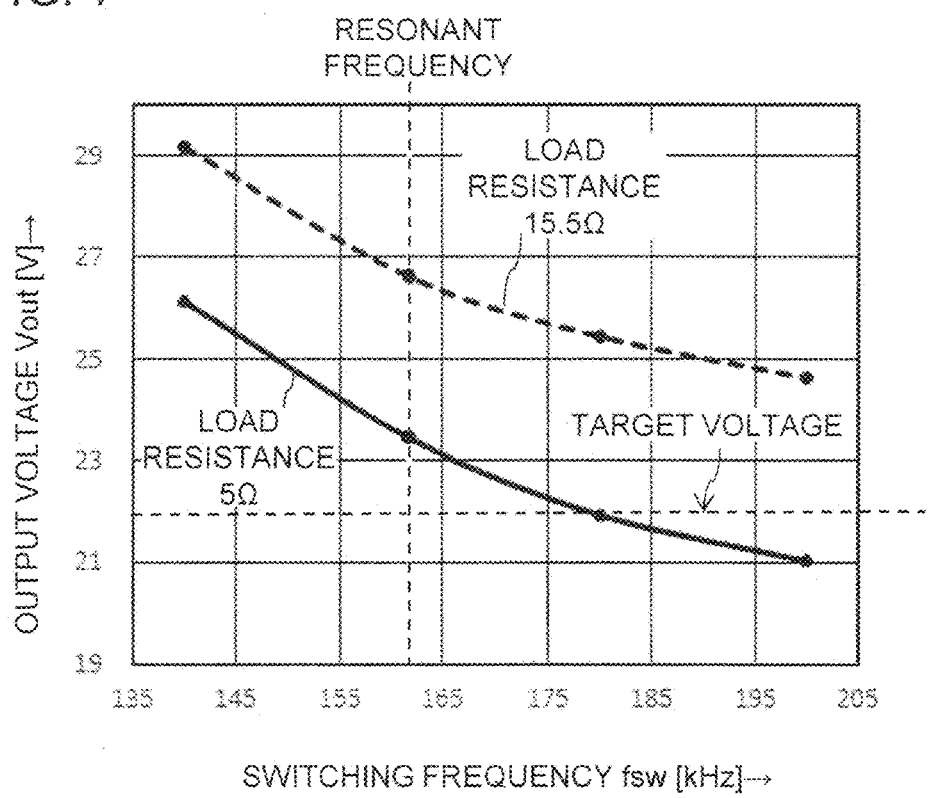
FIG. 7 is a graph illustrating characteristics of output voltage Vout versus switching frequency fsw for a power conversion apparatus according to a second comparison example, with a floating Y connection but without a switch circuit SW.

FIG. 7 is a graph illustrating characteristics of output voltage Vout versus switching frequency fsw for a power conversion apparatus according to a second comparison example, with a floating Y connection but without a switch circuit SW. FIG. 7 illustrates the characteristics of output voltage Vout versus switching frequency fsw for the power conversion apparatus configured by removing the capacitors C1 and C2 and the switch circuit SW from the power conversion apparatus 5 of FIG. 2, with changing the load resistance of the load apparatus 6. According to FIG. 7, it can be seen that when the power conversion apparatus operates at a switching frequency fsw, the output voltage Vout more largely changes upon a change in the load resistance, as compared with that of FIG. 6. In the example of FIG. 7, in particular, when a large load resistance (15.5Ω) is applied, the difference between the output voltage Vout and the target voltage increases, and there is no switching frequency fsw by which the target voltage can be achieved, near the resonant frequency of the LLC resonant converters. According to FIG. 7, even when a large load resistance is applied, it is expected that the output voltage Vout is decreased to the target voltage by increasing the switching frequency fsw. However, in this case, the difference between the switching frequency fsw and the resonant frequency of the LLC resonant converters increases, and the switching frequency fsw may go beyond the range of operable switching frequencies fsw. Therefore, there is a possibility to fail to achieve the target voltage. In addition, the output voltage Vout may increase in a high frequency band, due to the parasitic capacitance of the diodes, the parasitic capacitance among the windings of the transformers, and the like. Therefore, there is a possibility to fail to achieve the target voltage. Thus, in the case where the power conversion apparatus has a floating Y connection on the primary circuit of the transformers, the characteristics of output voltage Vout versus switching frequency fsw significantly varies depending on the load resistance. Therefore, in particular, when a large load resistance is applied (that is, when a small load current flows), the target voltage can not be not achieved.

According to FIG. 7, when a large load resistance (15.5Ω) is applied, a higher switching frequency fsw is required to achieve the same output voltage Vout as that of a small load resistance (5Ω). This may be because a current flows from the primary winding of one transformer to the primary winding of another transformer via the node N2, and this current generates a magnetizing current in the secondary winding of the latter transformer, which can not be canceled.

Figure 8:
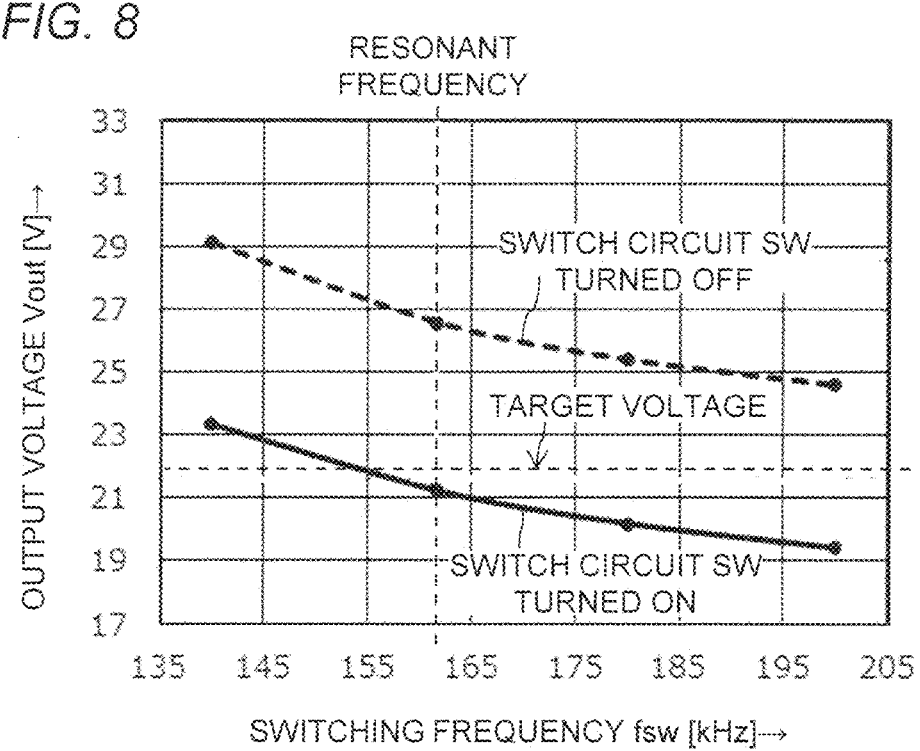
FIG. 8 is a graph illustrating characteristics of output voltage Vout versus switching frequency fsw for the power conversion apparatus 5 of FIG. 1.

FIG. 8 is a graph illustrating characteristics of output voltage Vout versus switching frequency fsw for the power conversion apparatus 5 of FIG. 1. When the switch circuit SW is turned off, and a small load current flows, the characteristics as indicated by the broken line of FIG. 8 are obtained. In this case, there is a large difference between the output voltage Vout and the target voltage, and it is difficult to bring the output voltage Vout closer to the target voltage. On the other hand, by turning on the switch circuit SW, the characteristics as indicated by the solid line of FIG. 8 are obtained. In this case, it is possible to easily achieve the target voltage near the resonant frequency of the LLC resonant converters.

Figure 9:
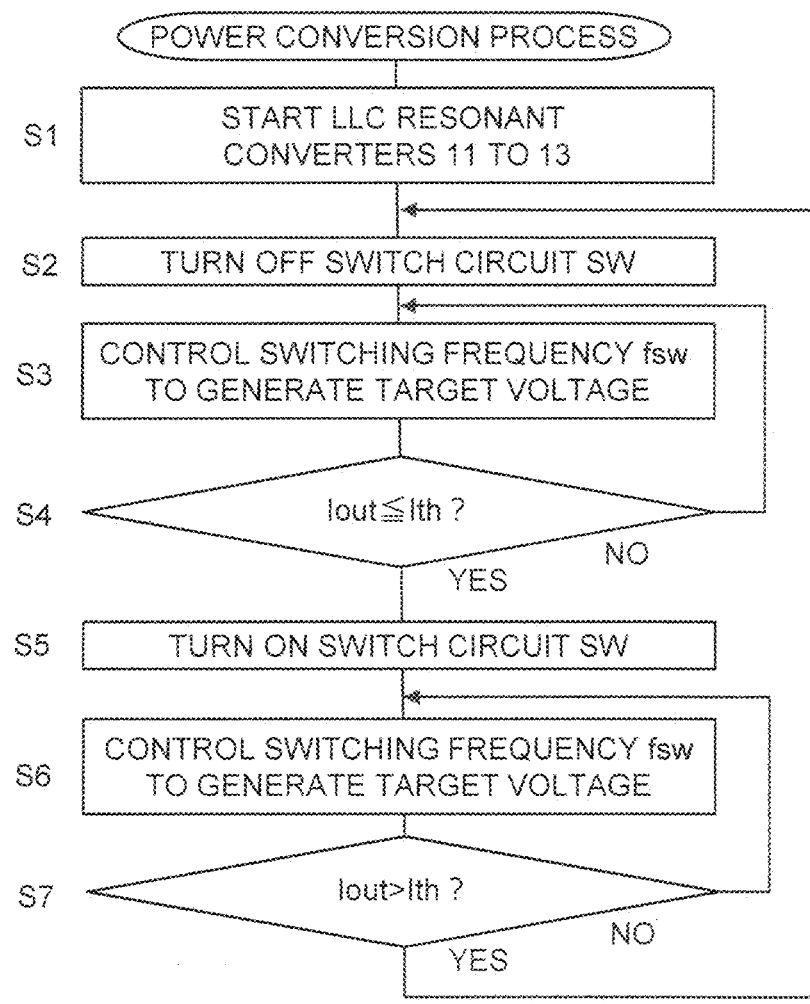
FIG. 9 is a flowchart illustrating a power conversion process executed by a control circuit 15 of FIG. 2.

FIG. 9 is a flowchart illustrating a power conversion process executed by the control circuit 15 of FIG. 2.

When starting the power conversion process, the switch circuit SW may be initially being turned off.

In step S1, the control circuit 15 starts the LLC resonant converters 11 to 13 by controlling the driving circuit 14 to start transmitting control signals to the switching elements Q1 to Q6, respectively. At this time, the control circuit 15 may soft-start the LLC resonant converters 11 to 13. When the capacitor C3 is charged, inrush currents may flow via the switching elements Q1 to Q6. The inrush currents are less likely to occur by soft-starting the LLC resonant converters 11 to 13.

In step S2, the control circuit 15 turns off the switch circuit SW.

In step S3, the control circuit 15 controls the switching frequency fsw so as to bring the output voltage Vout closer to the target voltage, based on a present output voltage Vout obtained from the voltage sensor 16, thus generating the target voltage.

In step S4, the control circuit 15 determines whether or not the present output current Iout obtained from the current sensor 17 is equal to or smaller than a predetermined threshold Ith: if YES, the process proceeds to step S5; if NO, the process returns to step S3. The threshold Ith may be set to, for example, 10% of the largest current flowing through the load apparatus 6.

In step S5, the control circuit 15 turns on the switch circuit SW.

Figure 10:
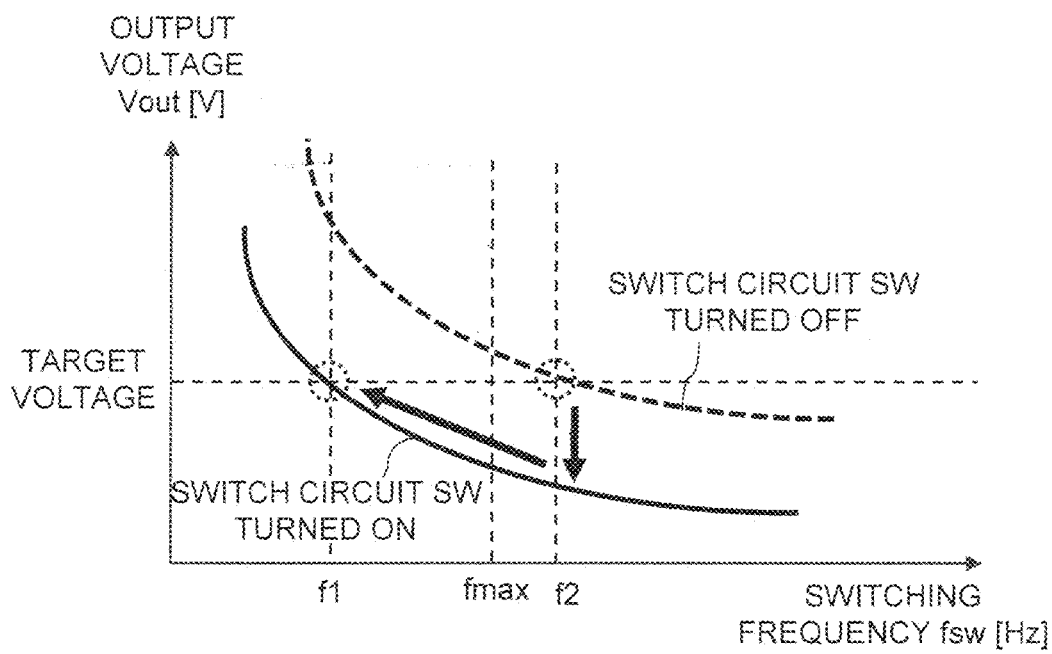
FIG. 10 is a graph schematically illustrating operations of the power conversion apparatus 5, occurring when a small load current flows through a load apparatus 6 connected to the power conversion apparatus 5 of FIG. 1.

FIG. 10 is a graph schematically illustrating the operations of the power conversion apparatus 5, occurring when a small load current flows through the load apparatus 6 connected to the power conversion apparatus 5 of FIG. 1. When the output current Iout is equal to or smaller than threshold Ith (in step S4, YES), the control circuit 15 determines that a small load current flows. When the switch circuit SW is turned off, and a small load current flows, for example, the characteristics indicated by the broken line of FIG. 10 are obtained. In this case, in a frequency range equal to or lower than a highest frequency fmax of the operable switching frequencies fsw, there is a large difference between the output voltage Vout and the target voltage. In addition, in this case, a frequency f2 higher than the highest frequency fmax of the operable switching frequencies fsw is required to achieve the target voltage. Therefore, by turning on the switch circuit SW in step S5, for example, the characteristics indicated by the solid line of FIG. 10 are obtained. In this case, it is possible to achieve the target voltage at the frequency f1 within the range of operable switching frequencies fsw.

In step S6 of FIG. 9, the control circuit 15 controls the switching frequency fsw to bring the output voltage Vout closer to the target voltage, based on the present output voltage Vout obtained from the voltage sensor 16, thus generating the target voltage.

In step S7, the control circuit 15 determines whether or not the present output current Iout obtained from the current sensor 17 is larger than the threshold Ith: if YES, the process returns to step S2; if NO, the process returns to step S6.

Figure 11:
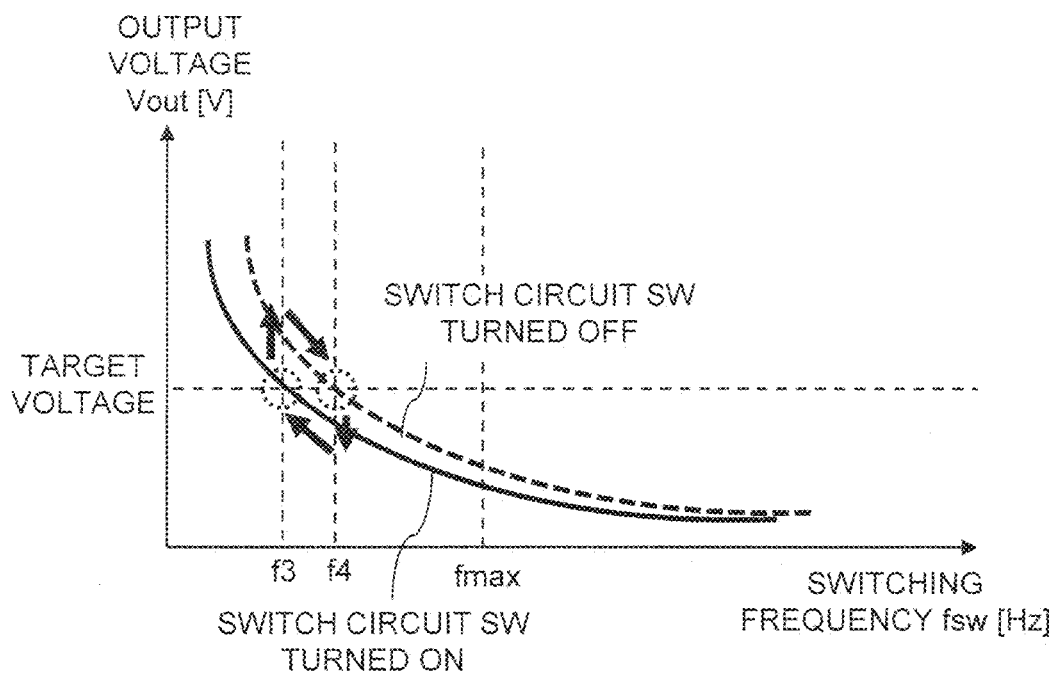
FIG. 11 is a graph schematically illustrating the operations of the power conversion apparatus 5, occurring when a moderate or larger load current flows through the load apparatus 6 connected to the power conversion apparatus 5 of FIG. 1.

FIG. 11 is a graph schematically illustrating the operations of the power conversion apparatus 5, occurring when a moderate or larger load current flows through the load apparatus 6 connected to the power conversion apparatus 5 of FIG. 1. When the output current Iout is larger than the threshold Ith (in step S7, YES), the control circuit 15 determines that a moderate or more load current flows. When a moderate or more load current flows, only a small change occurs in the characteristics of output voltage Vout versus switching frequency fsw, regardless of whether the switch circuit SW is turned on or off, as indicated by the solid line and the broken line of FIG. 11. The target voltage can be achieved at frequencies f3 and f4 within the range of frequencies equal to or lower than the highest frequency fmax of the operable switching frequencies fsw. Therefore, by turning off the switch circuit SW in step S2, it is possible to generate the output voltage Vout near the target voltage, as well as alleviate current unbalance due to the variations among the circuit components of the power conversion apparatus 5.

Figure 12:
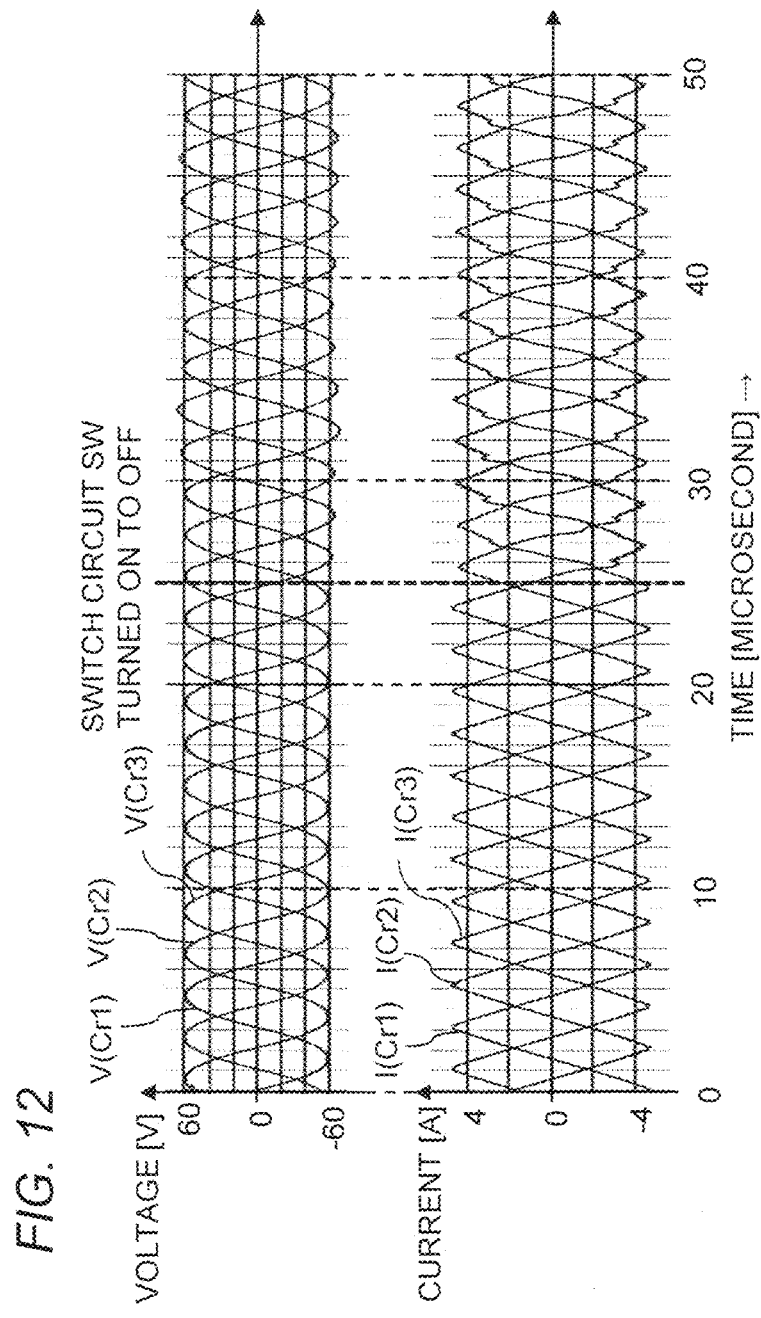
FIG. 12 is a graph illustrating exemplary waveforms of voltages and currents at resonant capacitors Cr1 to Cr3, occurring when the switch circuit SW of FIG. 2 transitions from on to off.
Figure 13:
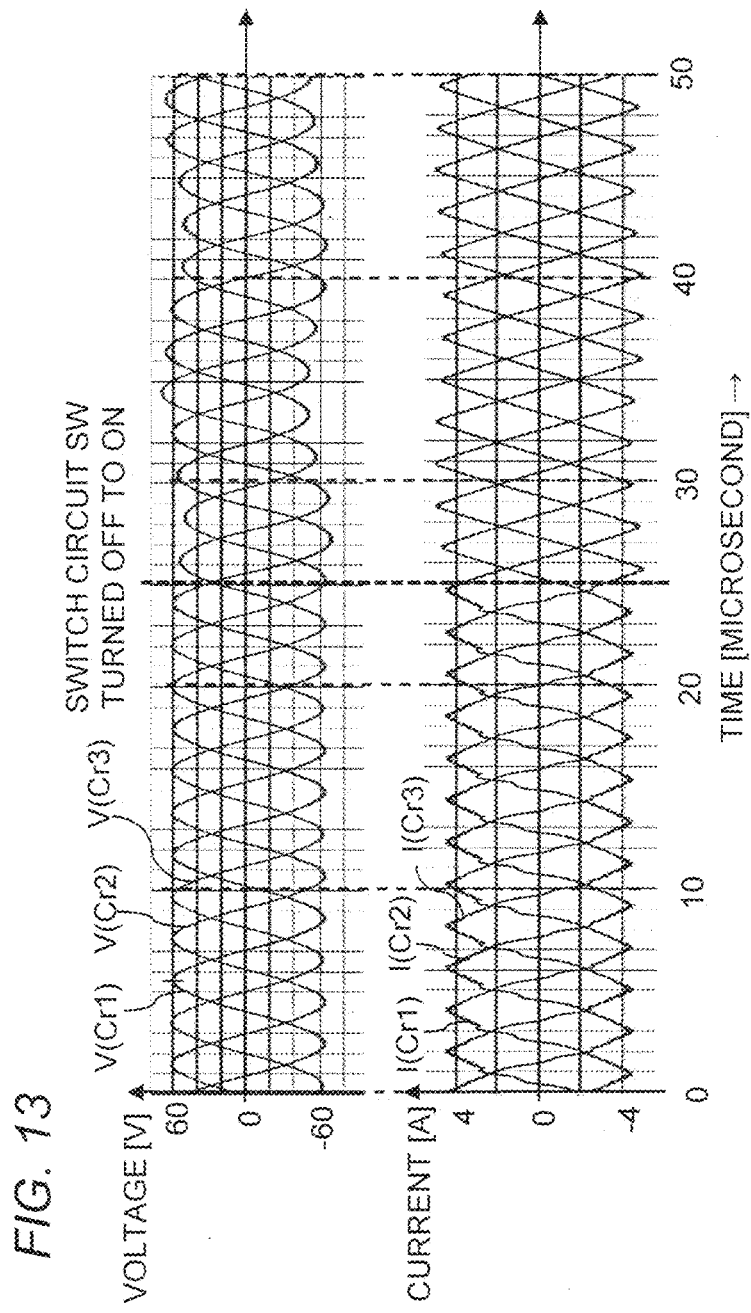

FIG. 12 is a graph illustrating exemplary waveforms of voltages and currents of the resonant capacitors Cr1 to Cr3, occurring when the switch circuit SW of FIG. 2 transitions from on to off. FIG. 13 is a graph illustrating exemplary waveforms of voltages and currents at the resonant capacitors Cr1 to Cr3, occurring when the switch circuit SW of FIG. 2 transitions from off to on. V(Cr1), V(Cr2), and V(Cr3) indicate voltages across both ends of each of the resonant capacitors Cr1 to Cr3, that is, the voltage potentials at the node N2 with respect to the voltage potentials of the terminals b1 to b3 of the windings w1, w4, and w7, respectively. In addition, I(Cr1), I(Cr2), and I(Cr3) indicate currents flowing from the terminals b1 to b3 toward the node N2 via the resonant capacitors Cr1 to Cr3, respectively. As mentioned above, the switch circuit SW is configured to pass currents in both directions when turned on, and to block currents in both directions when turned off. Using such a switch circuit SW, there are no significant effects on the waveforms of the voltage and the current, when the switch circuit SW transitions from on to off, or vice versa.

Figure 14:
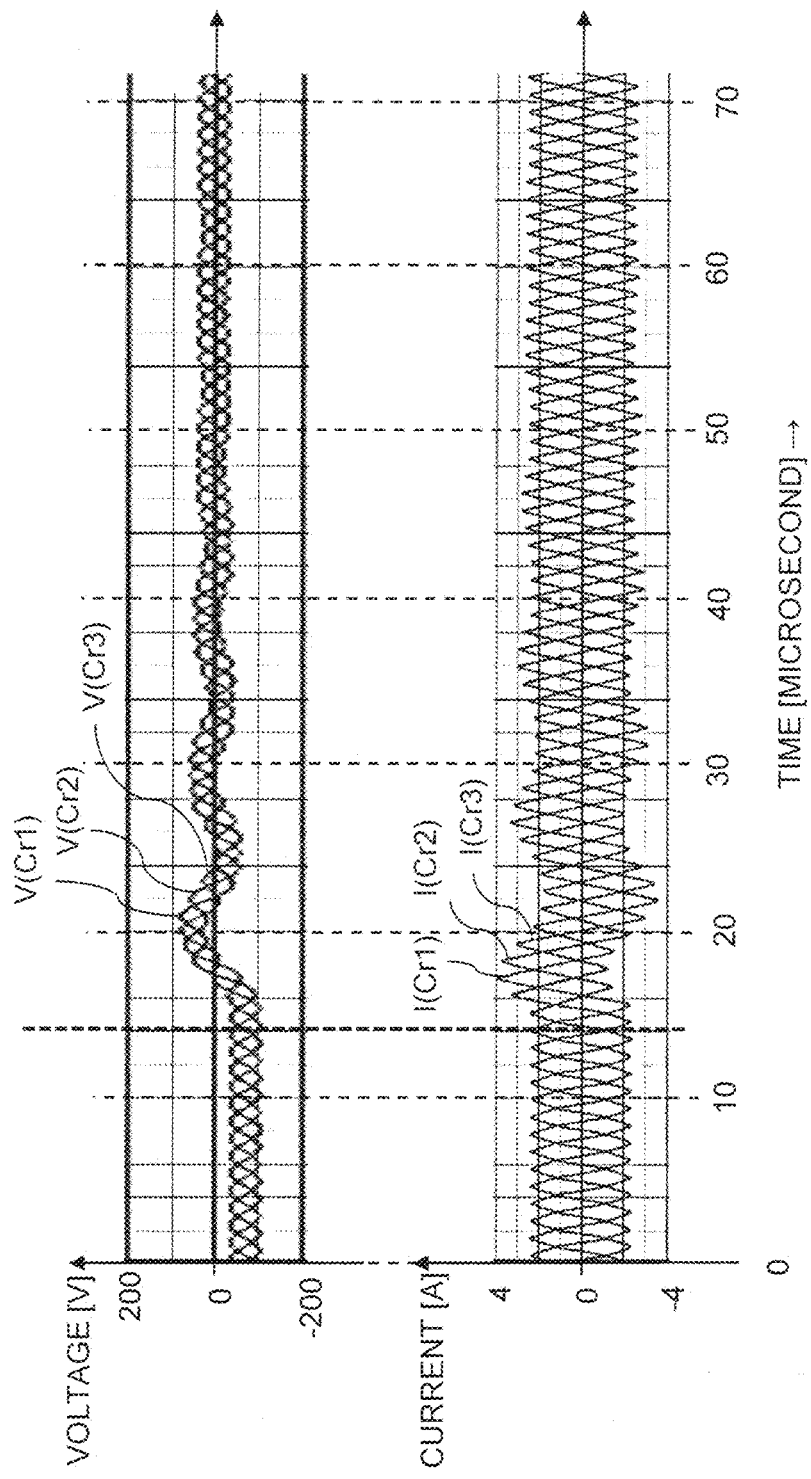

FIG. 14 is a graph illustrating exemplary waveforms of voltages and currents at the resonant capacitors Cr1 to Cr3 for a power conversion apparatus according to a third comparison example, with one switch element, instead of the switch circuit SW of FIG. 2, occurring when the switch element transitions from off to on. In this case, the switch element is, for example, a MOSFET. The MOSFET is provided with a body diode, and when turned off, a current flows through the body diode in one direction. Therefore, in this case, when the switch element is turned off, the switch element can not block one of the positive current and the negative current flowing between the nodes N1 and N2 via the switch element, and therefore, unbalance in currents occurs. According to FIG. 14, when the switch element is turned off, an offset of about −100 V occurs in the voltage across both ends of each of the resonant capacitors Cr1 to Cr3. In addition, according to FIG. 14, immediately after the switch element transitions from off to on, the waveforms of the voltage and the current vary largely. On the other hand, according to the power conversion apparatus 5 of the embodiment, by using the switch circuit SW configured to pass the currents in both directions when turned on, and to block the currents in both directions when turned off, unbalance in the currents and offsets in the voltages are less likely to occur. In addition, according to the power conversion apparatus 5 of the embodiment, there are no significant effects on the waveforms of the voltage and the current when the switch circuit SW transitions from on to off, or vice versa, as described with reference to FIGS. 12 and 13.

Modified Embodiment of First Embodiment

Figure 15:
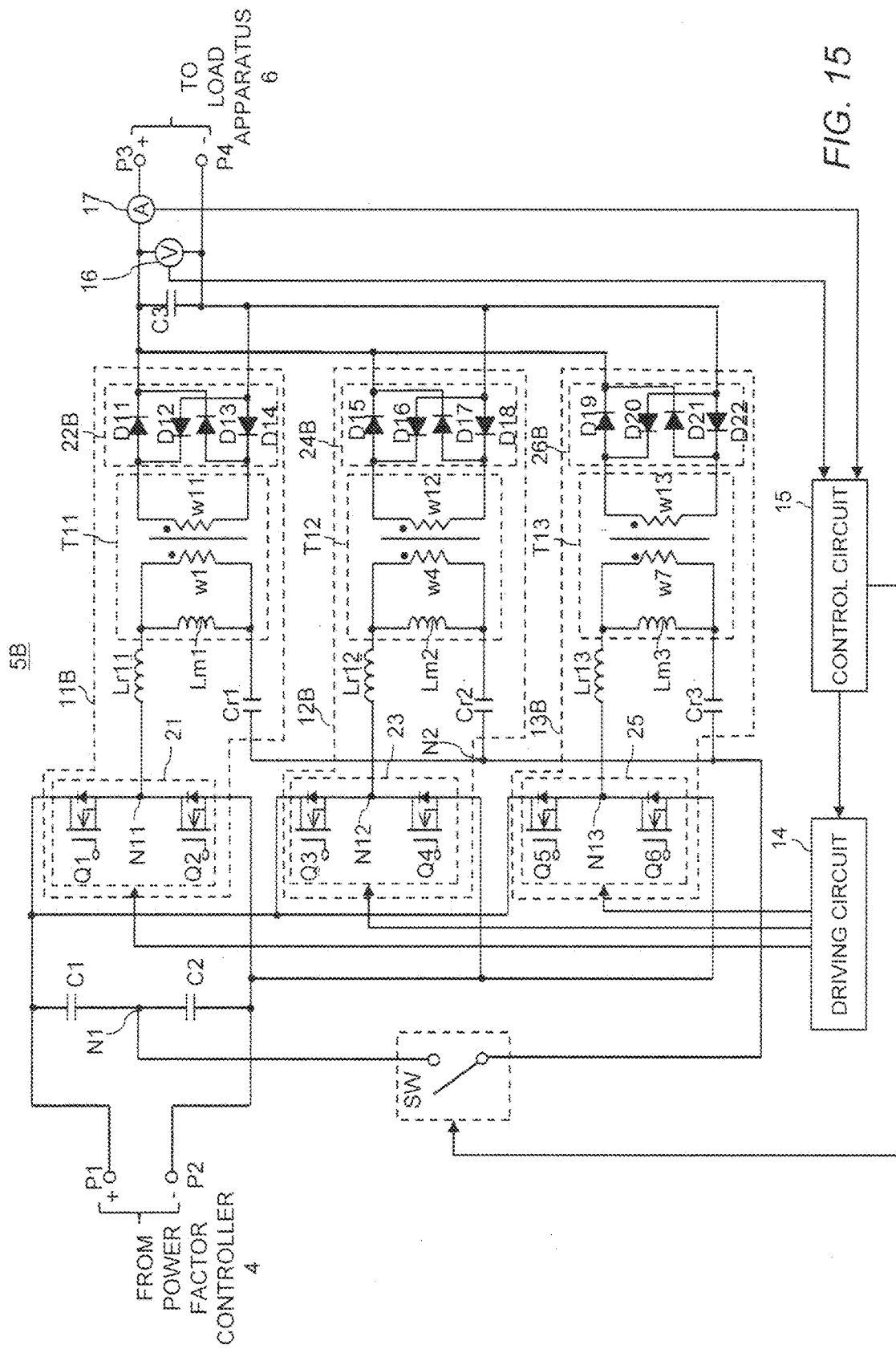
FIG. 15 is a circuit diagram schematically illustrating a configuration example of a power conversion apparatus 5B according to a first modified embodiment of the first embodiment.

FIG. 15 is a circuit diagram schematically illustrating a configuration example of a power conversion apparatus 5B according to a first modified embodiment of the first embodiment. The power conversion apparatus 5B of FIG. 15 is provided with LLC resonant converters 11B to 13B, instead of the LLC resonant converters 11 to 13 of FIG. 2.

The LLC resonant converter 11B is provided with a transformer T11 and an inductor Lr11, instead of the transformer T1 of FIG. 2, and provided with a rectifier circuit 22B, instead of the rectifier circuit 22 of FIG. 2. In addition, the LLC resonant converter 12B is provided with a transformer T12 and an inductor Lr12, instead of the transformer T2 of FIG. 2, and provided with a rectifier circuit 24B, instead of the rectifier circuit 24 of FIG. 2. In addition, the LLC resonant converter 13B is provided with a transformer T13 and an inductor Lr13, instead of the transformer T3 of FIG. 2, and provided with a rectifier circuit 26B, instead of the rectifier circuit 26 of FIG. 2.

The LLC resonance circuits of the LLC resonant converters 11B to 13B may include discrete inductors Lr11 to Lr13, respectively, instead of the leakage inductances Lr1 to Lr3 of the transformers T1 to T3.

The transformer T11 has a primary winding w1 and a secondary winding w11. The rectifier circuit 22B is a full-bridge rectifier circuit of diodes D11 to D14. The secondary winding w11 is connected to the output terminals P3 and P4 of the power conversion apparatus 5B via the rectifier circuit 22B. In addition, the transformer T12 has a primary winding w4 and a secondary winding w12. The rectifier circuit 24B is a full-bridge rectifier circuit of diodes D15 to D18. The secondary winding w12 is connected to the output terminals P3 and P4 of the power conversion apparatus 5B via the rectifier circuit 24B. In addition, the transformer T13 has a primary winding w7 and a secondary winding w13. The rectifier circuit 26B is a full-bridge rectifier circuit of diodes D19 to D22. The secondary winding w13 is connected to the output terminals P3 and P4 of the power conversion apparatus 5B via the rectifier circuit 26B.

Figure 16:
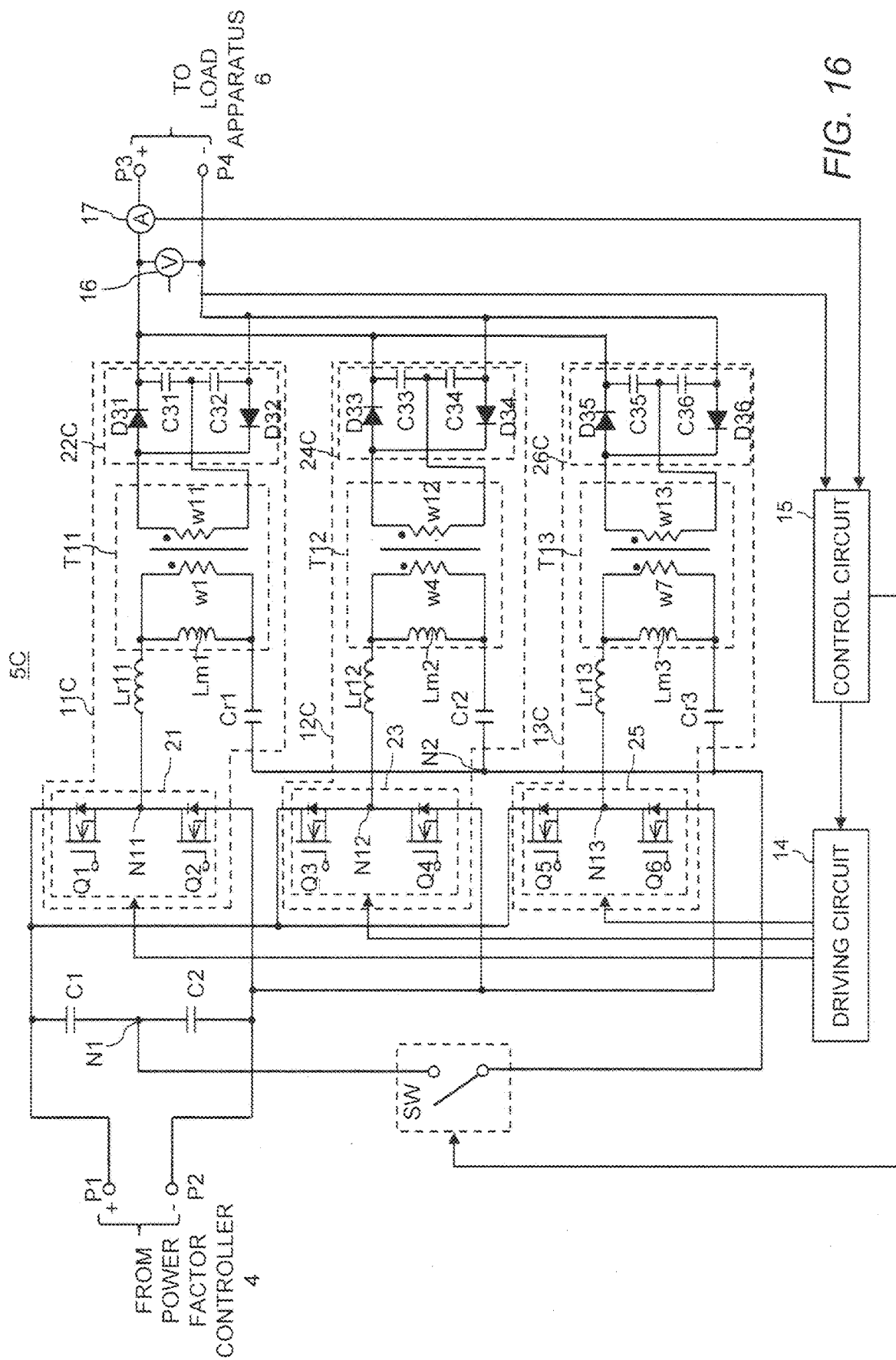
FIG. 16 is a circuit diagram schematically illustrating a configuration example of a power conversion apparatus 5C according to a second modified embodiment of the first embodiment.

FIG. 16 is a circuit diagram schematically illustrating a configuration example of a power conversion apparatus 5C according to a second modified embodiment of the first embodiment. The power conversion apparatus 5C of FIG. 16 is provided with LLC resonant converters 11C to 13C, instead of the LLC resonant converters 11 to 13 of FIG. 2. In addition, the capacitor C3 of FIG. 15 is removed.

The LLC resonant converter 11C is provided with a rectifier circuit 22C, instead of the rectifier circuit 22B of FIG. 15. In addition, the LLC resonant converter 12C is provided with a rectifier circuit 24C, instead of the rectifier circuit 24B of FIG. 15. In addition, the LLC resonant converter 13C is provided with a rectifier circuit 26C, instead of the rectifier circuit 26B of FIG. 15.

The rectifier circuit 22C is provided with diodes D31, D32 and capacitors C31, C32. The secondary winding w11 of the transformer T11 is connected to the output terminals P3 and P4 of the power conversion apparatus 5C via a voltage doubler rectifier circuit of the diodes D31, D32 and the capacitors C31, C32. In addition, the rectifier circuit 24C is provided with diodes D33, D34 and capacitors C33, C34. The secondary winding w12 of the transformer T12 is connected to the output terminals P3 and P4 of the power conversion apparatus 5C via a voltage doubler rectifier circuit of the diodes D33, D34 and the capacitors C33, C34. In addition, the rectifier circuit 26C is provided with diodes D35, D36 and capacitors C35, C36. The secondary winding w13 of the transformer T13 is connected to the output terminals P3 and P4 of the power conversion apparatus 5C via a voltage doubler rectifier circuit of the diodes D35, D36 and the capacitors C35, C36.

Only some part of the configurations illustrated of FIGS. 15 and 16 may be applied to the power conversion apparatus 5 of FIG. 2. For example, the LLC resonant converters 11 to 13 of FIG. 2 may be provided with the inductors Lr11 to Lr13 of FIG. 15, respectively. In addition, the LLC resonant converters 11 to 13 of FIG. 2 may be provided with the transformers T11 to T13 and the rectifier circuits 22B, 24B, and 26B of FIG. 15, instead of the transformers T1 to T3 and the rectifier circuits 22, 24, and 26. In addition, the LLC resonant converters 11 to 13 of FIG. 2 may be provided with the transformers T11 to T13 and the rectifier circuits 22C, 24C, and 26C of FIG. 16, instead of the transformers T1 to T3 and the rectifier circuits 22, 24, and 26. As a result, it is possible to improve the degree of freedom in designing the power conversion apparatus.

According to the power conversion apparatuses 5, 5B, and 5C of the embodiments, because the Y connection (that is, the node N2) is provided only on the primary circuits of the transformers T1 to T3, it is possible to use various types of rectifier circuits on the secondary circuits of the transformers T1 to T3. For example, it is possible to select a rectifier circuit according to the specifications of a product, e.g., input/output power.

Advantageous Effects of First Embodiment

According to the power conversion apparatus 5 of the embodiment, when a small load current flows through the load apparatus 6, the power conversion apparatus 5 can operate the inverter circuits 21, 23, and 25 within the range of operable switching frequencies fsw by turning on the switch circuit SW, thus achieving the desired output voltage Vout. In addition, according to the power conversion apparatus 5 of the embodiment, when a moderate or more load current flows through the load apparatus 6, the switch circuit SW is turned off, so that the primary windings w1, w4, w7 of the transformers T1 to T3 are connected as a floating Y connection, and therefore, it is possible to alleviate unbalance in the currents due to the variations among the circuit components of the power conversion apparatus 5. In addition, when a moderate or more load current flows through the load apparatus 6, the inverter circuits 21, 23, and 25 can operate within the range of operable switching frequencies fsw, thus achieving the desired output voltage Vout. Thus, the power conversion apparatus 5 according to the embodiment can achieve the desired output voltage Vout even when the load current varies.

According to the power conversion apparatus 5 of the embodiment, by using the switch circuit SW configured to pass currents in both directions when turned on, and to block currents in both directions when turned off, unbalance in the currents and offsets in the voltages are less likely to occur. In addition, according to the power conversion apparatus 5 of the embodiment, significant effects on the waveforms of the voltage and the current are less likely to occur, when the switch circuit SW transitions from on to off, or vice versa.

Since the power conversion apparatus 5 according to the embodiment is provided with the plurality of LLC resonant converters 11 to 13, the heat source can be distributed throughout the housing of the power conversion apparatus 5. Therefore, for example, it is possible to provide a high-power and high-power-density DC/DC converter apparatus without any cooling fan.

Second Embodiment

Now, a power system provided with a power conversion apparatus according to a second embodiment will be further described.

Configuration Example of Second Embodiment

Figure 17:
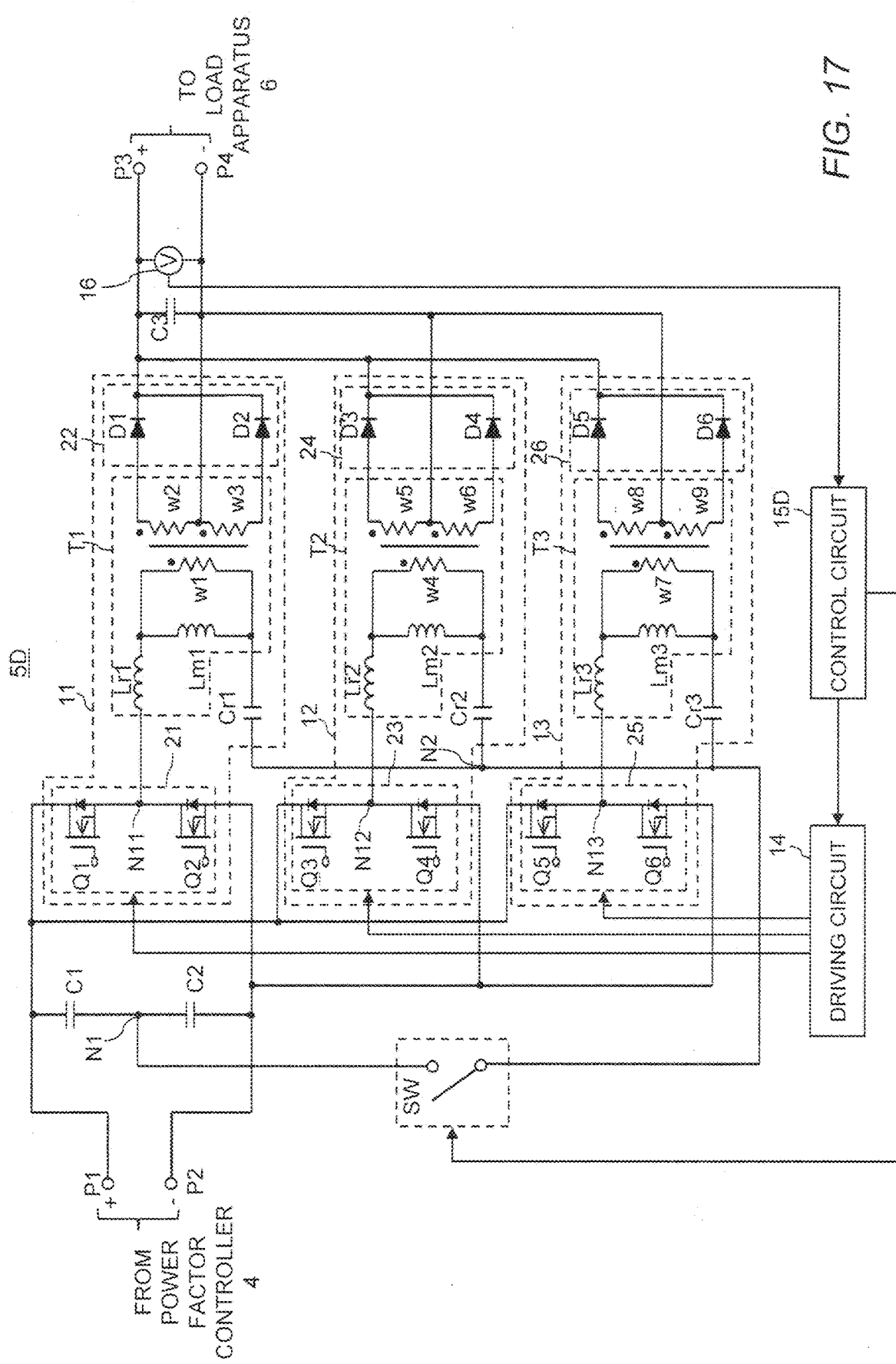
FIG. 17 is a circuit diagram schematically illustrating a configuration example of a power conversion apparatus 5D according to a second embodiment.

FIG. 17 is a circuit diagram schematically illustrating a configuration example of a power conversion apparatus 5D according to the second embodiment. The power conversion apparatus 5D of FIG. 17 is provided with a control circuit 15D, instead of the control circuit 15 and the current sensor 17 of FIG. 2.

The control circuit 15D determines whether or not the load current of the load apparatus 6 is equal to or smaller than the predetermined criterion, based on a present switching frequency fsw of inverter circuits 21, 23, and 25 set in the driving circuit 14, instead of based on the output current Iout. The switching frequency fsw set to the driving circuit 14 by the control circuit 15D is also stored in an internal memory (not shown) of the control circuit 15D. As described with reference to FIGS. 6 and 7, the characteristics of output voltage Vout versus switching frequency fsw vary depending on the load current (or load resistance) of the load apparatus 6. Near the resonant frequency of LLC resonant converters 11 to 13, the switching frequency fsw at which the predetermined target voltage is achieved increases as the load current decreases and decreases as the load current increases. Therefore, the control circuit 15D turn on the switch circuit SW when the switching frequency fsw is equal to or higher than a threshold fth1 and turns off the switch circuit SW when the switching frequency fsw is lower than a threshold fth2 lower than the threshold fth1.

Operation Example of Second Embodiment

Figure 18:
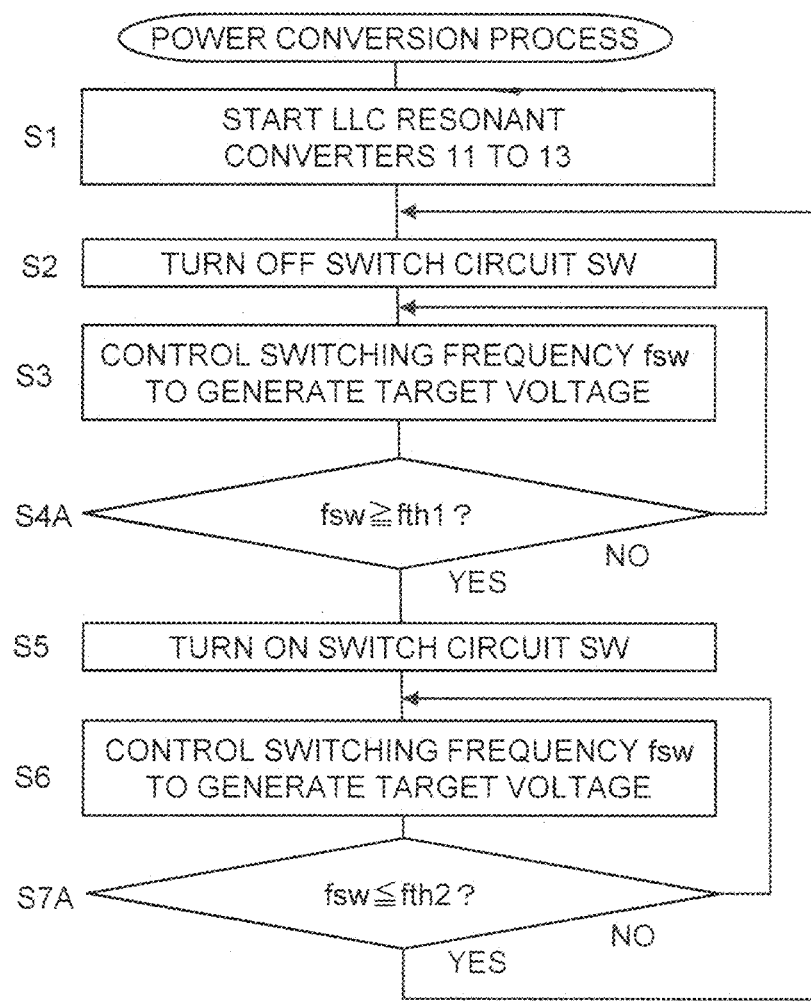
FIG. 18 is a flowchart illustrating a power conversion process executed by a control circuit 15D of FIG. 17.

FIG. 18 is a flowchart illustrating a power conversion process executed by the control circuit 15D of FIG. 17. In the flowchart of FIG. 18, steps S4A and S7A are executed, instead of steps S4 and S7 of FIG. 9.

In step S4A, the control circuit 15D determines whether or not a present switching frequency fsw is equal to or higher than a predetermined threshold fth1: if YES, the process proceeds to step S5; if NO, the process returns to step S3. The threshold fth1 may be set equal to the highest frequency fmax of the operable switching frequencies fsw or may be set to the resonant frequency of the LLC resonant converters 11 to 13.

Figure 19:
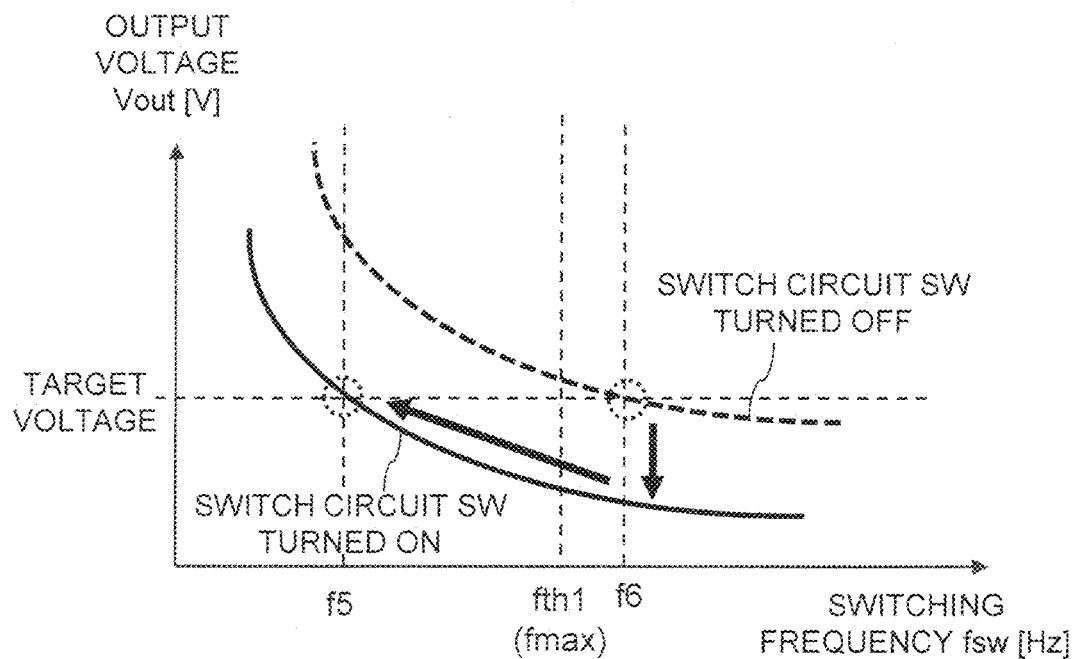
FIG. 19 is a graph schematically illustrating the operations of the power conversion apparatus 5D, occurring when the switching frequency fsw exceeds an upper limit threshold fth1 in step S4A of FIG. 18.

FIG. 19 is a graph schematically illustrating the operations of the power conversion apparatus 5D, occurring when the switching frequency fsw exceeds the upper limit threshold fth1 in step S4A of FIG. 18. If the switching frequency fsw is equal to or higher than the threshold fth1 (in step S4A, YES), the control circuit 15D determines that a small load current flows. If the switch circuit SW is turned off, and a small load current flows, for example, the characteristics indicated by the broken line of FIG. 19 are obtained. In this case, a frequency f6 higher than the highest frequency fmax of the operable switching frequencies fsw, is required to achieve the target voltage. Therefore, by turning on the switch circuit SW in step S5, for example, the characteristics indicated by the solid line of FIG. 19 are obtained. In this case, it is possible to achieve the target voltage at frequency f5 within a range of frequencies equal to or lower than the highest frequency fmax of the operable switching frequencies fsw.

In step S7A of FIG. 18, the control circuit 15D determines whether or not the present switching frequency fsw is equal to or lower than a predetermined threshold fth2: if YES, the process returns to step S2; if NO, the process returns to step S6. For example, when the switch circuit SW is turned on, and a predetermined load current (for example, 25% of the rated current) flows through the load apparatus 6, the threshold fth2 may be set to a switching frequency at which the target voltage is achieved.

Figure 20:
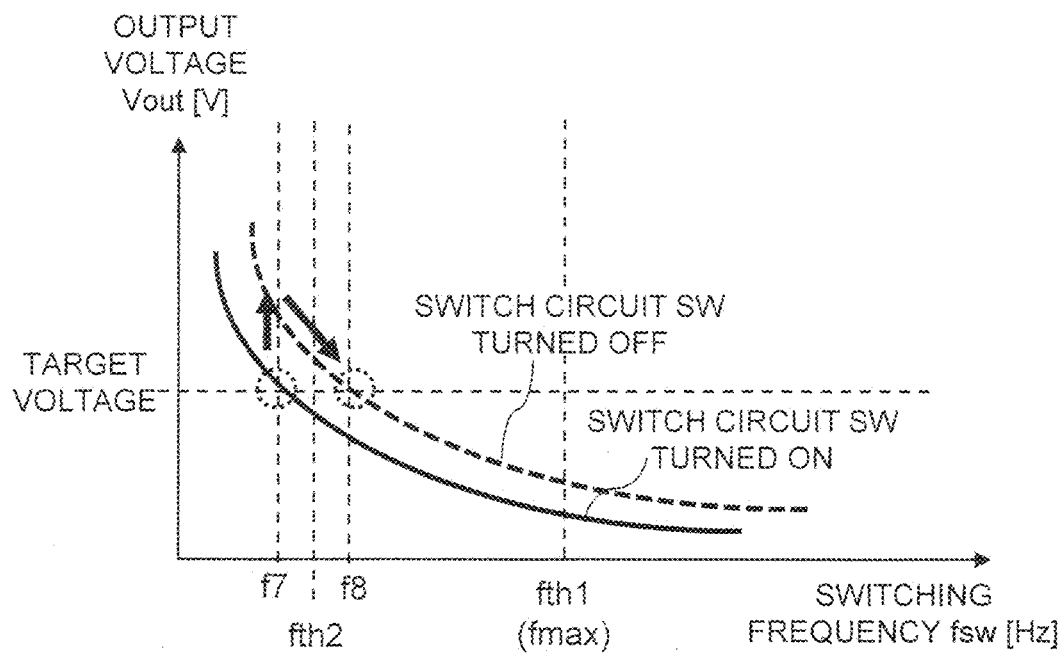
FIG. 20 is a graph schematically illustrating the operations of the power conversion apparatus 5D, occurring when the switching frequency fsw drops below a lower limit threshold fth2 in step S7A of FIG. 18.

FIG. 20 is a graph schematically illustrating the operations of the power conversion apparatus 5D, occurring when the switching frequency fsw drops below the lower limit threshold fth2 in step S7A of FIG. 18. If the switching frequency fsw is equal to or below the threshold fth2 (in step S7A, YES), the control circuit 15D determines that a moderate or more load current flows. If a moderate or more load current flows, only a small change occurs in the characteristics of output voltage Vout versus switching frequency fsw, regardless of whether the switch circuit SW is turned on or off, as indicated by the solid line and the broken line of FIG. 20. The target voltage can be achieved at frequencies f7 and f8 within the frequency range that is equal to or lower than the highest frequency fmax of the operable switching frequencies fsw. Therefore, by turning off the switch circuit SW in step S2, it is possible to generate the output voltage Vout near the target voltage, as well as alleviate unbalance in the currents due to variations among circuit components of the power conversion apparatus 5D.

Advantageous Effects of Second Embodiment

The power conversion apparatus 5D according to the second embodiment determines whether or not the load current of the load apparatus 6 is equal to or smaller than the predetermined criterion, based on the switching frequency fsw, instead of the output current Tout. As a result, the power conversion apparatus 5D according to the second embodiment can achieve the desired output voltage Vout even when the load current varies, in a manner similar to that of the power conversion apparatus 5 according to the first embodiment.

Modified Embodiment

Although the embodiments of the present disclosure have been described in detail above, the above descriptions are mere examples of the present disclosure in all respects. Needless to say, various improvements and modifications can be made without departing from the scope of the present disclosure. For example, the following changes can be made. Hereinafter, components similar to those of the above embodiments are indicated by similar reference signs, and points similar to those of the above embodiments will be omitted as appropriate. The following modified embodiments can be combined as appropriate.

A power conversion apparatus according to the embodiment may be provided with a switch circuit including relays, instead of the switch circuit including switching elements, such as MOSFETs, as illustrated in FIGS. 3 and 4.

A power conversion apparatus according to the embodiment may be provided with four or more LLC resonant converters to generate AC power at four or more phases, not limited to the three phases. In this case, each of the LLC resonant converters is provided with a transformer having a primary winding and a secondary winding, an inverter circuit connected to the primary winding, a resonant capacitor connected to the primary winding, and a rectifier circuit connected to the secondary winding. Each of the primary windings has a first end connected to a corresponding inverter circuit, and a second end not connected to the inverter circuit but connected to primary windings of other ones of the LLC resonant converters. Also in this case, the switch circuit is connected between a node at which an intermediate voltage potential between the positive voltage potential and the negative voltage potential at the input terminals occurs, and a node of a star connection where the primary windings of the transformers of the LLC resonant converters are connected to one another. The switch circuit is controlled in a manner similar to that of the switch circuit SW in the power conversion apparatus according to the first or second embodiment described above.

A power system may be provided with a DC power supply apparatus, instead of the AC power supply apparatus 1 and the rectifier 3. In addition, a power system may be provided with an inverter and an AC load apparatus, instead of the DC load apparatus 6. The power conversion apparatuses according to the embodiments are also applicable in these examples.

[Summary]

The power conversion apparatus and the power systems according to the aspects of the present disclosure may be expressed as follows.

According to a power conversion apparatus 5 of an aspect of the present disclosure, the power conversion apparatus 5 is provided with three or more LLC resonant converters 11 to 13. Each one of the LLC resonant converters 11 to 13 is provided with: a transformer T1 to T3 having a primary winding and a secondary winding; an inverter circuit 21, 23, 25 connected to the primary winding, a resonant capacitor Cr1 to Cr3 connected to the primary winding, and a rectifier circuit 22, 24, 26 connected to the secondary winding, the primary winding having a first end a1 to a3 connected to the inverter circuit 21, 23, 25, and a second end b1 to b3 not connected to the inverter circuit 21, 23, 25 but connected to primary windings of other ones of the LLC resonant converters 11 to 13. The power conversion apparatus 5 further is provided with: a first input terminal P1 and a second input terminal P2 connected to the inverter circuits 21, 23, 25 of the LLC resonant converters 11 to 13, a first node N1 at which an intermediate voltage potential between a voltage potential of the first input terminal P1 and a voltage potential of the second input terminal P2 occurs, a second node N2 connected to the second ends b1 to b3 of the primary windings of the LLC resonant converters 11 to 13, a switch circuit SW connected between the first node N1 and the second node N2, a driving circuit 14 configured to operate the inverter circuits 21, 23, 25 of the LLC resonant converters 11 to 13 at a switching frequency fsw and at different phases from one another, a control circuit 15 configured to control the switch circuit SW and the driving circuit 14, and a first output terminal P3 and a second output terminal P4 connected to the rectifier circuits 22, 24, 26 of the LLC resonant converters 11 to 13. The control circuit 15 is configured to turn on the switch circuit SW when a load current of a load apparatus 6 connected to the first output terminal P3 and the second output terminal P4 is equal to or smaller than a predetermined criterion and turn off the switch circuit SW when the load current of the load apparatus 6 is larger than the predetermined criterion.

According to the power conversion apparatus 5 of the aspect of the present disclosure, the power conversion apparatus 5 is further provided with a current sensor 17 configured to measure an output current Tout at the first output terminal P3 or the second output terminal P4. The control circuit 15D is configured to determine that the load current of the load apparatus 6 is equal to or smaller than the predetermined criterion when the output current Tout is equal to or smaller than a first threshold Ith, thereby turning on the switch circuit SW, and the control circuit 15 is configured to determine that the load current of the load apparatus 6 is larger than the predetermined criterion when the output current Tout is larger than the first threshold Ith, thereby turning off the switch circuit SW.

According to the power conversion apparatus 5 of the aspect of the present disclosure, the power conversion apparatus 5 the control circuit 15 is configured to determine that the load current of the load apparatus 6 is equal to or smaller than the predetermined criterion when the switching frequency fsw is equal to or higher than a second threshold fth1, thereby turning on the switch circuit SW, and the control circuit 15 is configured to determine that the load current of the load apparatus 6 is larger than the predetermined criterion when the switching frequency fsw is equal to lower than a third threshold fth2 that is lower than the second threshold fth1, thereby turning off the switch circuit SW.

According to the power conversion apparatus 5 of the aspect of the present disclosure, the power conversion apparatus 5 is further provided with a voltage sensor 16 configured to measure an output voltage Vout across the first output terminal P3 and the second output terminal P4. The control circuit 15 is configured to control the driving circuit 14 to change the switching frequency fsw so as to bring the output voltage Vout closer to a predetermined target voltage.

According to the power conversion apparatus 5 of the aspect of the present disclosure, the switch circuit SW is configured to pass currents in both directions when the switch circuit SW is turned on, and to block currents in both directions when the switch circuit SW is turned off.

According to the power conversion apparatus 5 of the aspect of the present disclosure, the power conversion apparatus 5 is further provided with a pair of second capacitors C1, C2 connected in series across the first input terminal P1 and the second input terminal P2, the pair of second capacitors C1, C2 having capacitances equal to each other. The first node N1 is provided between the pair of second capacitors C1, C2.

According to a power system of an aspect of the present disclosure, the power system is provided with: a power supply apparatus configured to supply a first DC voltage, a power conversion apparatus 5 configured to convert the first DC voltage into a second DC voltage, and a load apparatus 6 configured to operate with the second DC voltage.

According to the power system of the aspect of the present disclosure, the power supply apparatus is provided with: a noise filtering apparatus 2 configured to reduce at least one of a normal mode noise signal and a common mode noise signal, a rectifier 3 configured to convert an AC voltage into the first DC voltage, and a power factor controller 4 configured to bring a power factor of the first DC voltage closer to 1.

INDUSTRIAL APPLICABILITY

The power conversion apparatus according to one aspect of the present disclosure is applicable to, for example, a power system operable as a power supply system that receives AC power and outputs DC power at about 2 kW.

REFERENCE SIGNS LIST

1: AC POWER SUPPLY APPARATUS
2: NOISE FILTERING APPARATUS
3: RECTIFIER
4: POWER FACTOR CONTROLLER
5, 5B to 5D: POWER CONVERSION APPARATUS
6: LOAD APPARATUS
11 to 13, 11B to 13B, 11C to 13C: LLC RESONANT CONVERTER
14: DRIVING CIRCUIT
15, 15D: CONTROL CIRCUIT
16: VOLTAGE SENSOR
17: CURRENT SENSOR
21, 23, 25: INVERTER CIRCUIT
22, 24, 26, 22B, 24B, 26B, 22C, 24C, 26C: RECTIFIER CIRCUIT
Cr1 to Cr3: RESONANT CAPACITOR
C1 to C3, C31 to C36: CAPACITOR
D1 to D6, D11 to D22, D31 to D36, D101, D102: DIODE
Lm1 to Lm3: MAGNETIZING INDUCTANCE
Lr1 to Lr3: LEAKAGE INDUCTANCE
Lr11 to Lr13: INDUCTOR
N1, N2, N11 to N13: NODE
P1, P2: INPUT TERMINAL
P3, P4: OUTPUT TERMINAL
Q1 to Q6, Q101, Q102, Q111, Q112: SWITCHING ELEMENT
SW, SWA: SWITCH CIRCUIT
T1 to T3, T11 to T13: TRANSFORMER
w1 to w9, w11 to w13: WINDING

The invention claimed is:
1. A power conversion apparatus comprising three or more LLC resonant converters,
   wherein each one of the LLC resonant converters comprises: a transformer having a primary winding and a secondary winding; an inverter circuit connected to the primary winding, a first capacitor connected to the primary winding, and a rectifier circuit connected to the secondary winding, the primary winding having a first end connected to the inverter circuit, and a second end not connected to the inverter circuit but connected to primary windings of other ones of the LLC resonant converters,
   wherein the power conversion apparatus further comprises:
   a first input terminal and a second input terminal connected to the inverter circuits of the LLC resonant converters;
   a first node at which an intermediate voltage potential between a voltage potential of the first input terminal and a voltage potential of the second input terminal occurs;
   a second node connected to the second ends of the primary windings of the LLC resonant converters;
   a switch circuit connected between the first node and the second node;
   a driving circuit configured to operate the inverter circuits of the LLC resonant converters at a switching frequency and at different phases from one another;
   a control circuit configured to control the switch circuit and the driving circuit; and a first output terminal and a second output terminal connected to the rectifier circuits of the LLC resonant converters, and wherein the control circuit is configured to turn on the switch circuit when a load current of a load apparatus connected to the first output terminal and the second output terminal is equal to or smaller than a predetermined criterion, and turn off the switch circuit when the load current of the load apparatus is larger than the predetermined criterion.

2. The power conversion apparatus as claimed in claim 1, further comprising a current sensor configured to measure an output current at the first output terminal or the second output terminal, wherein the control circuit is configured to determine that the load current of the load apparatus is equal to or smaller than the predetermined criterion when the output current is equal to or smaller than a first threshold, thereby turning on the switch circuit, and the control circuit is configured to determine that the load current of the load apparatus is larger than the predetermined criterion when the output current is larger than the first threshold, thereby turning off the switch circuit.

3. The power conversion apparatus as claimed in claim 1, wherein the control circuit is configured to determine that the load current of the load apparatus is equal to or smaller than the predetermined criterion when the switching frequency is equal to or higher than a second threshold, thereby turning on the switch circuit, and the control circuit is configured to determine that the load current of the load apparatus is larger than the predetermined criterion when the switching frequency is equal to lower than a third threshold that is lower than the second threshold, thereby turning off the switch circuit.

4. The power conversion apparatus as claimed in claim 1, further comprising a voltage sensor configured to measure an output voltage across the first output terminal and the second output terminal, wherein the control circuit is configured to control the driving circuit to change the switching frequency so as to bring the output voltage closer to a predetermined target voltage.

5. The power conversion apparatus as claimed in claim 1, wherein the switch circuit is configured to pass currents in both directions when the switch circuit is turned on, and to block currents in both directions when the switch circuit is turned off.

6. The power conversion apparatus as claimed in claim 1, further comprising a pair of second capacitors connected in series across the first input terminal and the second input terminal, the pair of second capacitors having capacitances equal to each other wherein the first node is provided between the pair of second capacitors.

7. A power system comprising:

a power supply apparatus configured to supply a first DC voltage;

a power conversion apparatus configured to convert the first DC voltage into a second DC voltage; and a load apparatus configured to operate with the second DC voltage, wherein the power conversion apparatus comprise three or more LLC resonant converters, wherein each one of the LLC resonant converters comprises: a transformer having a primary winding and a secondary winding; an inverter circuit connected to the primary winding, a first capacitor connected to the primary winding, and a rectifier circuit connected to the secondary winding, the primary winding having a first end connected to the inverter circuit, and a second end not connected to the inverter circuit but connected to primary windings of other ones of the LLC resonant converters, wherein the power conversion apparatus further comprises:

a first input terminal and a second input terminal connected to the inverter circuits of the LLC resonant converters;

a first node at which an intermediate voltage potential between a voltage potential of the first input terminal and a voltage potential of the second input terminal occurs;

a second node connected to the second ends of the primary windings of the LLC resonant converters;

a switch circuit connected between the first node and the second node;

a driving circuit configured to operate the inverter circuits of the LLC resonant converters at a switching frequency and at different phases from one another;

a control circuit configured to control the switch circuit and the driving circuit; and a first output terminal and a second output terminal connected to the rectifier circuits of the LLC resonant converters, and wherein the control circuit is configured to turn on the switch circuit when a load current of a load apparatus connected to the first output terminal and the second output terminal is equal to or smaller than a predetermined criterion, and turn off the switch circuit when the load current of the load apparatus is larger than the predetermined criterion.

8. The power system as claimed in claim 7, wherein the power supply apparatus comprises:

a noise filtering apparatus configured to reduce at least one of a normal mode noise signal and a common mode noise signal;

a rectifier configured to convert an AC voltage into the first DC voltage; and a power factor controller configured to bring a power factor of the first DC voltage closer to 1.

* * * * *